(12) United States Patent
Combs

(10) Patent No.: US 11,867,321 B1
(45) Date of Patent: Jan. 9, 2024

(54) DISPENSING DEVICE AND METHOD OF USING SAME

(71) Applicant: Samuel Combs, Blairsville, GA (US)

(72) Inventor: Samuel Combs, Blairsville, GA (US)

(*) Notice: Subject to any disclaimer, the term of this patent is extended or adjusted under 35 U.S.C. 154(b) by 0 days.

(21) Appl. No.: 17/949,377

(22) Filed: Sep. 21, 2022

Related U.S. Application Data

(60) Provisional application No. 63/292,308, filed on Dec. 21, 2021, provisional application No. 63/270,338, filed on Oct. 21, 2021.

(51) Int. Cl.
  *F16L 1/032* (2006.01)
  *F16L 1/06* (2006.01)
  *E02F 3/96* (2006.01)

(52) U.S. Cl.
  CPC .............. *F16L 1/032* (2013.01); *F16L 1/065* (2013.01); *E02F 3/962* (2013.01)

(58) Field of Classification Search
  CPC . F16L 1/032; F16L 1/028; F16L 1/065; E02F 3/962
  See application file for complete search history.

(56) References Cited

U.S. PATENT DOCUMENTS

| | | | |
|---|---|---|---|
| 4,741,646 A * | 5/1988 | Hatch | E02F 5/145 405/175 |
| 4,993,503 A | 2/1991 | Fischer et al. | |
| 6,035,951 A | 3/2000 | Mercer et al. | |
| 6,260,790 B1 * | 7/2001 | Harrah | B65H 75/2227 242/604 |
| 8,596,916 B2 | 12/2013 | Rohde et al. | |
| 9,815,658 B1 | 11/2017 | Bigbee, Jr. et al. | |
| 11,136,881 B2 | 10/2021 | Chau et al. | |
| 2009/0236146 A1 | 9/2009 | Peirz | |

FOREIGN PATENT DOCUMENTS

| | | | | |
|---|---|---|---|---|
| CN | 105864507 A | * | 8/2016 | |
| GB | 2471488 A | * | 1/2011 | .............. B65H 49/24 |
| WO | WO-2017147656 A1 | * | 9/2017 | .............. B65H 49/32 |

* cited by examiner

*Primary Examiner* — Frederick L Lagman
(74) *Attorney, Agent, or Firm* — GRONHOLM PATENT SERVICES

(57) ABSTRACT

The present configuration relates to the use of a hanging bracket which may be assembled on a construction job site in order to allow such materials to be dispensed along with the use of typical onsite construction vehicles such as backhoes, bucket loaders, etc. This configuration allows for effective attachment to various bucket sizes, and also may be folded into a compact configuration when stored or transported.

15 Claims, 23 Drawing Sheets

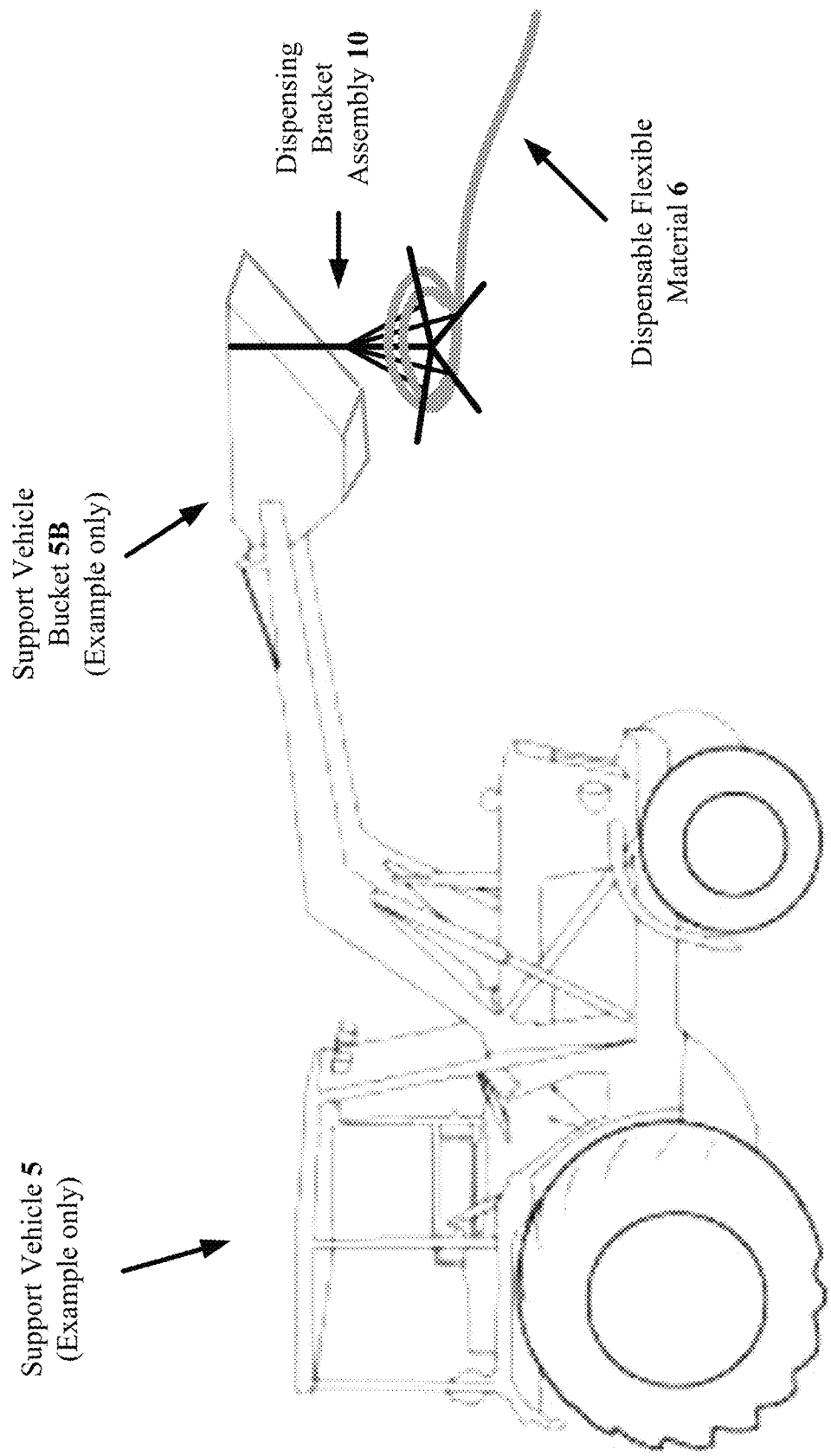

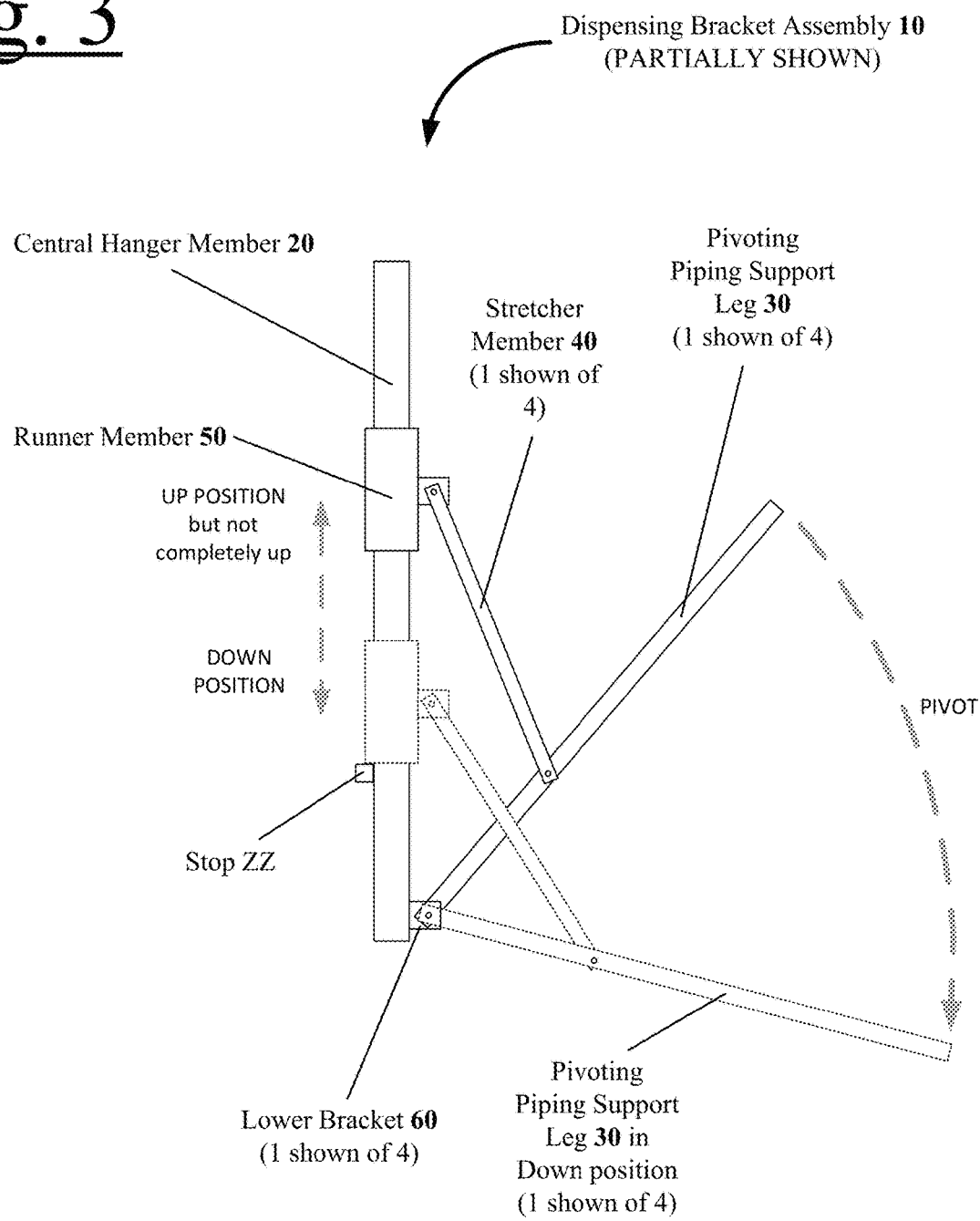

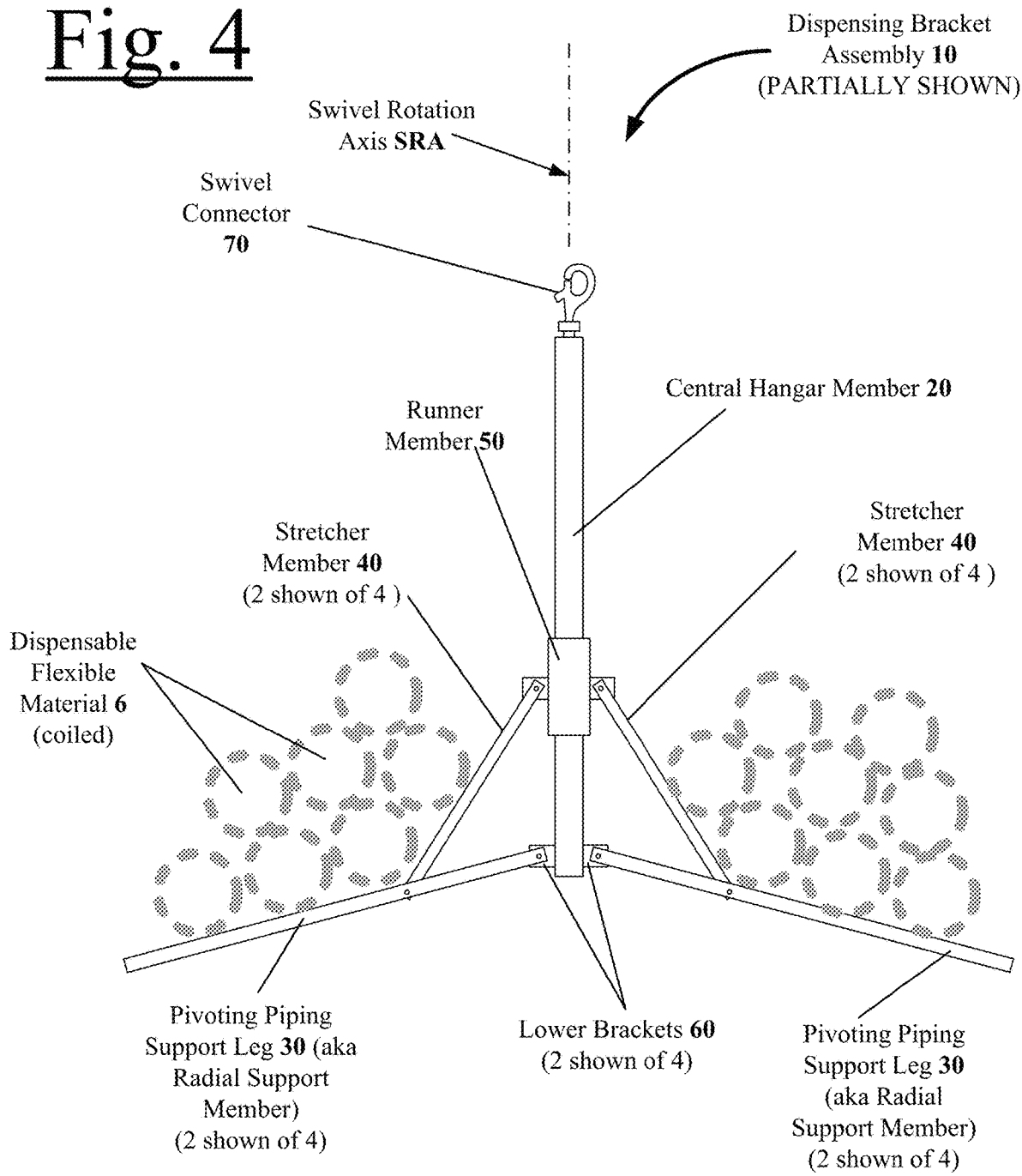

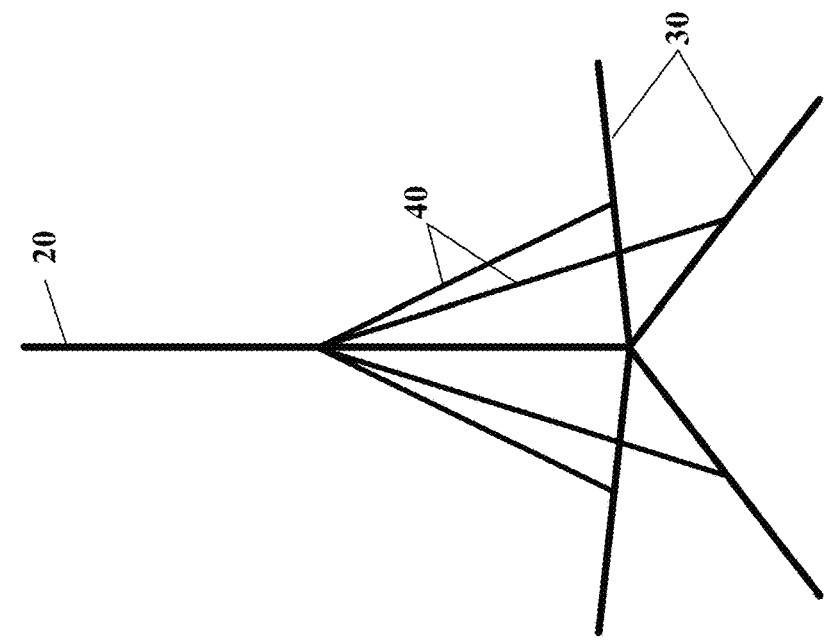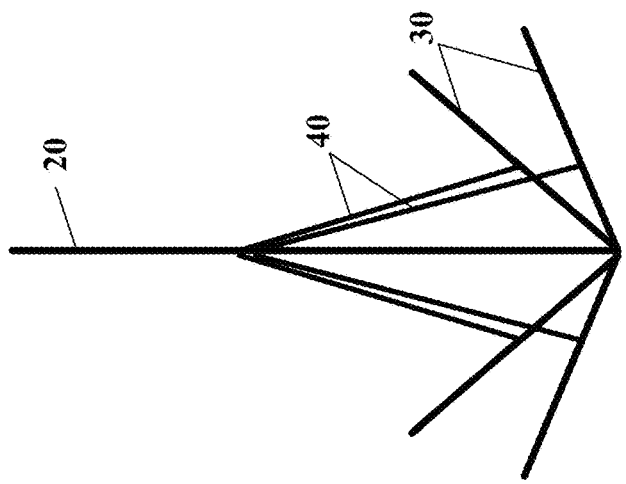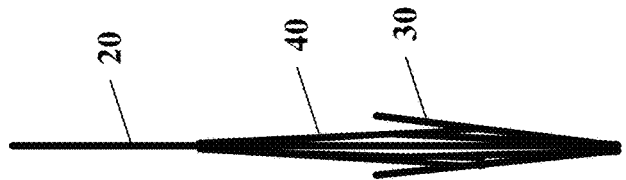

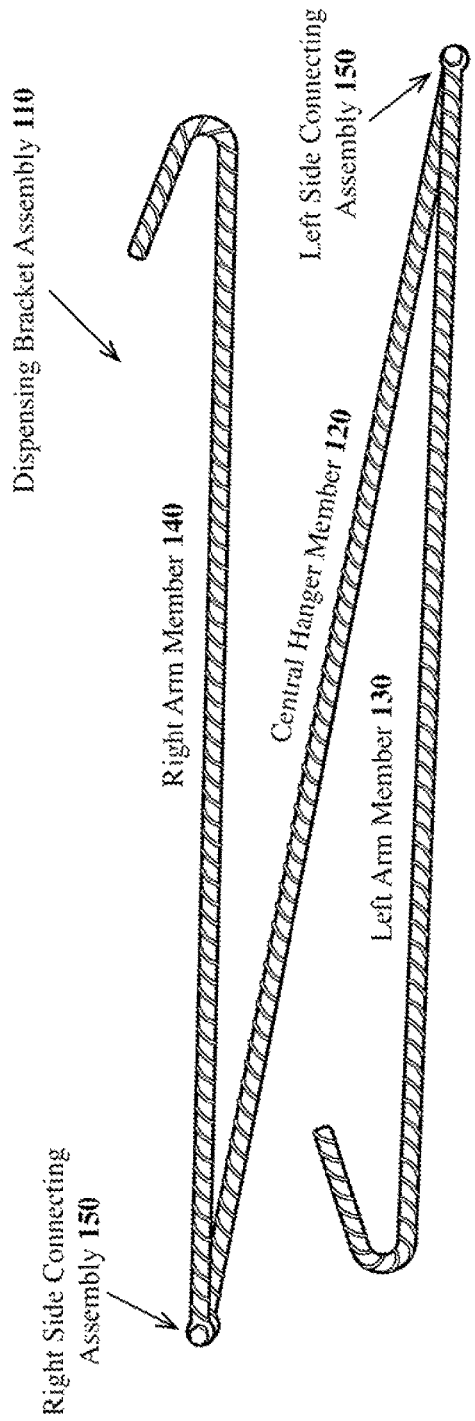
Fig. 20
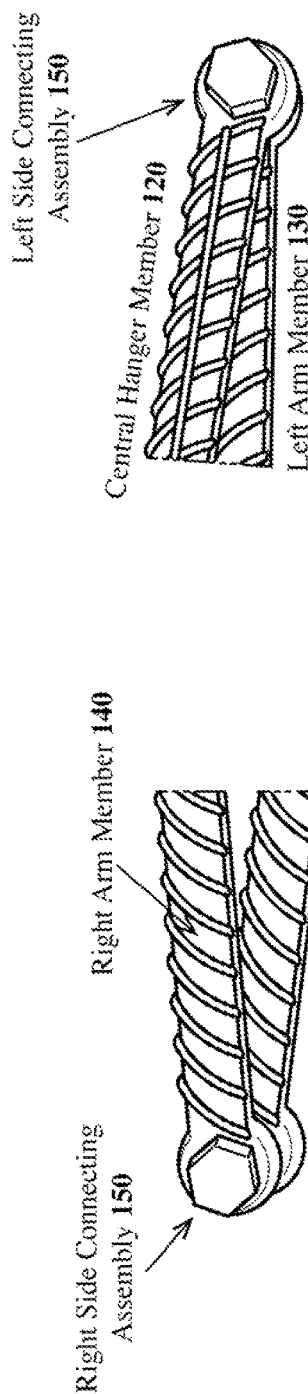
Fig. 21A
Fig. 21B

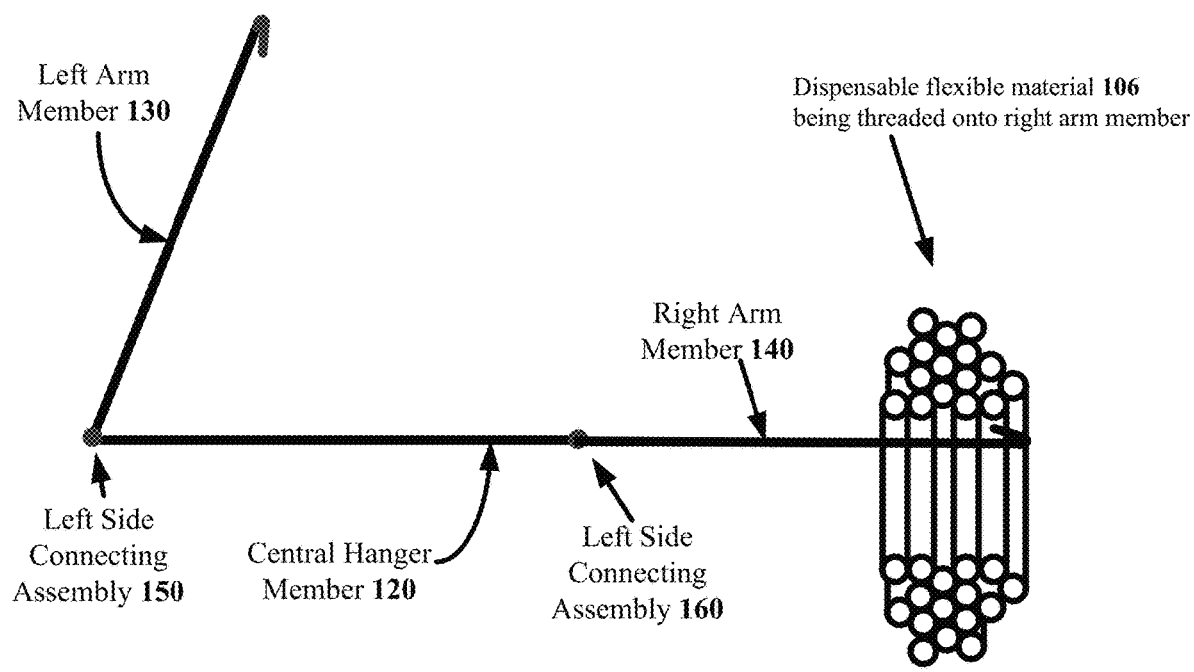
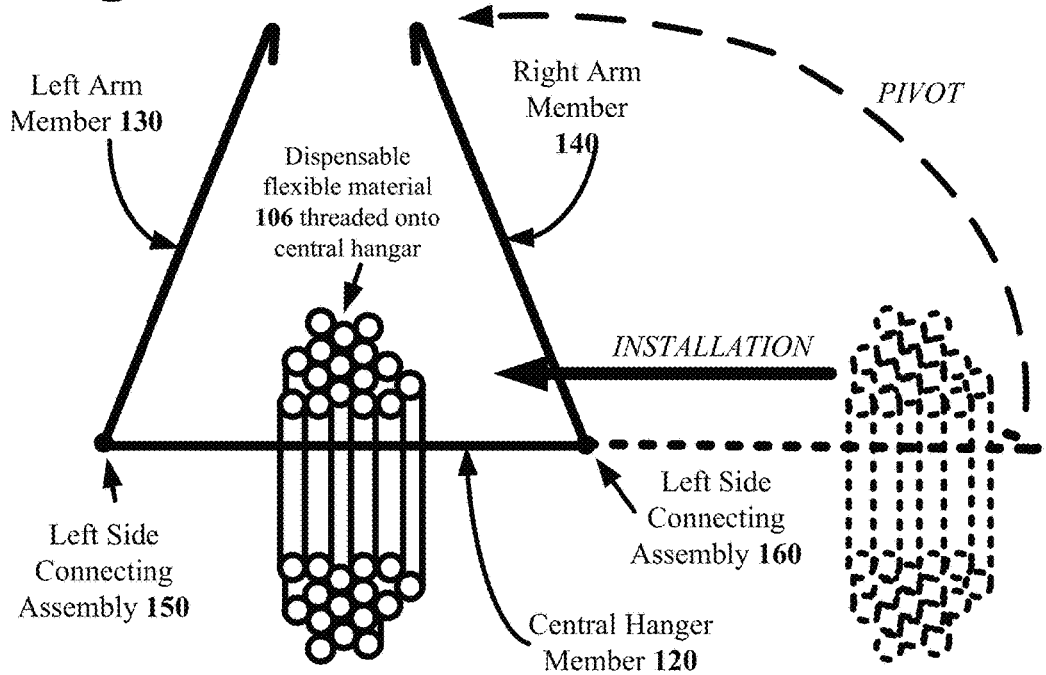

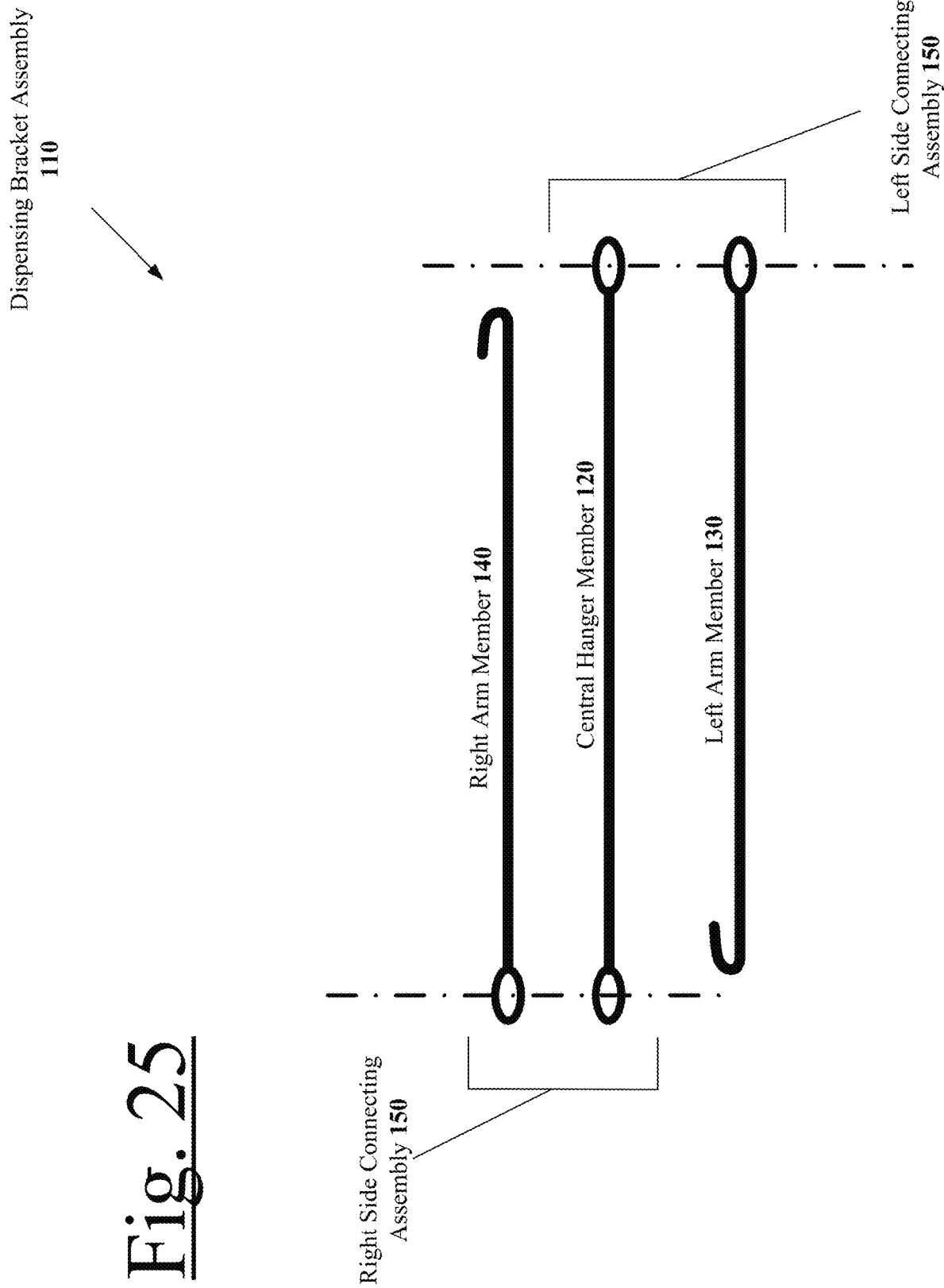

DISPENSING DEVICE AND METHOD OF USING SAME

FIELD

This disclosure relates to a unique and improved device, and method for operating same, which will allow for the dispensing of elongate materials such as pipe, tubing, or wire with the use of various supporting machinery.

BACKGROUND

Often in the outdoor construction field, there is a need to unroll and/or dispense coiled lengths of elongate materials such as wiring (electrical or fencing), flexible tubing, flexible drain or supply piping, or any other materials which can be coiled and/or stored on a spool. This can be cumbersome as the materials can be bulky and/or heavy, and the terrain unlevel. Thus improvements are needed.

SUMMARY

One aspect of the invention relates to the use of a portable hanging bracket which may be assembled and/or loaded on a construction job site in order to allow such materials to be dispensed along with the use of typical onsite construction vehicles such as backhoes, bucket loaders, etc. This configuration allows for effective attachment to various bucket sizes, and also may be folded into a compact configuration when stored or transported.

In one aspect of the present invention, a method is provided for dispensing flexible elongate piping into an elongate ditch defined by earthen ground, said method comprising the steps of: A) providing a backhoe having a bucket; B) providing a flexible coiled pipe configuration itself comprising a coil of said flexible elongate piping rolled into an overlapping circular configuration, said configuration defining a central hole including an axis therethrough about which said pipe is coiled, and including a free end; C) providing an elongate ditch in said earthen ground by use of said backhoe bucket; D) providing a dispensing hanger assembly convertible from a retracted position to an extended position, said hanger assembly itself including: 1) an elongate central frame member; 2) a plurality of foldable radial support members each retractably mounted relative to said central frame member, each of said foldable radial support members mounted to move between from a retracted position to an extended position relative to said central frame member as said hanger assembly is converted from said retracted position to an extended position; 3) an attachment portion configured to be attached to said backhoe bucket; and 4) a swivel connection configured to connect and provide a swivel connection between said elongate frame member and said attachment portion, such that said elongate central frame member and said radial support members can swivel relative to said attachment portion when attached to said bucket; E) unfolding said dispensing hanger assembly from said retracted position to said extended position; F) subsequent to Step "E", loading said coiled pipe configuration onto said dispensing hanger assembly while each of said foldable radial support members is in said extended position such that said coiled pipe configuration is in a loaded configuration, said loading including the insertion of said central frame member into said hole of said coiled pipe configuration such that at least two of said foldable radial support members support the weight of said coiled pipe configuration; G) subsequent to Step "F", attaching said attachment portion of said dispensing hanger assembly to said bucket of said backhoe such that said dispensing hanger assembly loaded with said coiled pipe configuration is hanging from said bucket; H) positioning said backhoe bucket proximate to said ditch; and I) subsequent to Step "H", dispensing said flexible coiled pipe configuration such that it uncoils into an elongate configuration and into said elongate ditch, by the use of a human manually grasping said free end of said coiled pipe configuration and pulling said pipe into and through said elongate ditch while the person is walking on said ground and said backhoe is stationary, such that said coiled pipe configuration is uncoiled as said elongate central frame member and said radial support members of said swivel relative to said attachment portion of said dispensing hanger assembly attached to said bucket.

Another aspect relates to the method as described above, wherein upon the completion of step "F", said elongate central frame member is vertical.

Another aspect relates to the method as described above, wherein upon the completion of step "F", said elongate central frame member is vertical, and such that said elongate central frame member and said radial support members can swivel relative to said attachment portion about a vertical axis when attached to said bucket.

Another aspect relates to the method as described above, wherein step "D" comprises the provision of four foldable radial support members each retractably mounted relative to said central frame member, each of said four foldable radial support members mounted to move between from a retracted position to an extended position relative to said central frame member as said hanger assembly is converted from said retracted position to an extended position.

Another aspect relates to the method as described above, wherein step "D" further comprises the provision of said four foldable radial support members each retractably mounted relative to said central frame member in a mechanically interconnected manner such that all radial support members extend and retract at the same time.

Another aspect relates to the method as described above, wherein step "H" is after Step "G", in that said positioning said backhoe bucket proximate to said ditch is done after said loading of said coiled pipe configuration onto said hanger assembly.

Another aspect relates to the method as described above, wherein upon the completion of step "F", said elongate central frame member is vertical, and such that said elongate central frame member and said radial support members can swivel relative to said attachment portion about a vertical axis when attached to said bucket.

Another aspect relates to the method as described above, wherein step "D" comprises the provision of four foldable radial support members each retractably mounted relative to said central frame member, each of said four foldable radial support members mounted to move between from a retracted position to an extended position relative to said central frame member as said hanger assembly is converted from said retracted position to an extended position Another aspect relates to the method as described above, wherein step "D" further comprises the provision of said four foldable radial support members each retractably mounted relative to said central frame member in a mechanically interconnected manner such that all radial support members extend and retract at the same time.

Another aspect relates to the method as described above, wherein step "H" is before Step "G", in that said positioning said backhoe bucket proximate to said ditch is done before said loading of said coiled pipe configuration onto said hanger assembly.

Another aspect relates to the method as described above, wherein upon the completion of step "F", said elongate central frame member is vertical, and such that said elongate central frame member and said radial support members can swivel relative to said attachment portion about a vertical axis when attached to said bucket.

Another aspect relates to the method as described above, wherein step "D" comprises the provision of four foldable radial support members each retractably mounted relative to said central frame member, each of said four foldable radial support members mounted to move between from a retracted position to an extended position relative to said central frame member as said hanger assembly is converted from said retracted position to an extended position Another aspect relates to the method as described above, wherein step "D" further comprises the provision of said four foldable radial support members each retractably mounted relative to said central frame member in a mechanically interconnected manner such that all radial support members extend and retract at the same time.

Another aspect relates to the method as described above, wherein in step "F", said attaching said attachment portion of said hanger assembly to said bucket of said backhoe includes the use of a loop member being a part of said attachment portion, said loop member configured to be attached to a tooth of said bucket.

In one aspect of the present invention, a method is provided for dispensing flexible elongate piping into an elongate ditch defined by earthen ground, said method comprising the steps of: A) providing a backhoe having a bucket; B) providing a flexible coiled pipe configuration itself comprising a coil of said flexible elongate piping rolled into an overlapping circular configuration, said configuration defining a central hole including an axis therethrough about which said pipe is coiled, and including a free end; C) providing an elongate ditch in said earthen ground by use of said backhoe bucket; D) providing a dispensing hanger assembly convertible from a retracted position to an extended position, said hanger assembly itself including: 1) an elongate central hanger member; and 2) two arm members each pivotably mounted at one end relative to said central frame member, and configured at their other end to attach to a backhoe or other vehicle bucket E) unfolding said dispensing hanger assembly from said retracted position to said extended position; F) subsequent to Step "E", loading said coiled pipe configuration onto said central hanger member such that said coiled pipe configuration is in a loaded configuration, said loading including the insertion of said central hanger member into said hole of said coiled pipe configuration such that at said central hanger member supports the weight of said coiled pipe configuration; G) subsequent to Step "F", attaching said arm members to said bucket of said backhoe such that said dispensing hanger assembly loaded with said coiled pipe configuration is hanging from said bucket; H) positioning said backhoe bucket proximate to said ditch; and I) subsequent to Step "H", dispensing said flexible coiled pipe configuration such that it uncoils into an elongate configuration and into said elongate ditch, by the use of a human manually grasping said free end of said coiled pipe configuration and pulling said pipe into and through said elongate ditch while the person is walking on said ground and said backhoe is stationary, such that said coiled pipe configuration is uncoiled as said elongate central frame member.

Another aspect relates to the method as described above, wherein step "H" is after Step "G", in that said positioning said bucket proximate to said ditch is done after said loading of said coiled pipe configuration.

Another aspect relates to the method as described above, wherein step "H" is before Step "G", in that said positioning said backhoe bucket proximate to said ditch is done before said loading of said coiled pipe configuration.

Another aspect of this invention relates to a dispensing hanger assembly convertible from a retracted position to an extended position, said hanger assembly itself including: 1) an elongate central frame member; 2) a plurality of foldable radial support members each retractably mounted relative to said central frame member, each of said foldable radial support members mounted to move between from a retracted position to an extended position relative to said central frame member as said hanger assembly is converted from said retracted position to an extended position; 3) an attachment portion configured to be attached to a backhoe bucket; and 4) a swivel connection configured to connect and provide a swivel connection between said elongate frame member and said attachment portion, such that said elongate central frame member and said radial support members can swivel relative to said attachment portion when attached to said bucket, said dispensing hanger assembly configured to facilitate the dispensing of a flexible coiled pipe configuration such that it uncoils into an elongate configuration and into said elongate ditch.

Another aspect of this invention relates to a dispensing hanger assembly convertible from a retracted position to an extended position, said hanger assembly itself including: providing a dispensing hanger assembly convertible from a retracted position to an extended position, said hanger assembly itself including: 1) an elongate central hanger member; and 2) two arm members each pivotably mounted at one end relative to said central frame member, and configured at their other end to attach to a backhoe or other vehicle bucket, such that said dispensing hanger assembly is configured to facilitate the dispensing of a flexible coiled pipe configuration such that it uncoils into an elongate configuration and into said elongate ditch as said elongate central hanger is substantially horizontal.

These and other objects and aspects will become readily apparent upon further review of the following specification and drawings. Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 2 is another illustrative drawing showing the dispensing bracket assembly 10 mounted to and supported by a typical support vehicle 5 (in this case having a front end loader, but other bucket-type vehicles are contemplated).

FIG. 3 is a front plan view of a portion of the dispensing bracket assembly 10 as it might be viewed in suspension from a typical supporting bucket during use. The dispensing bracket assembly 10 includes a central hanger member 20, four pivoting piping support legs 30 (of four total, one is shown in FIG. 3), stretcher members 40 (of four total, one is shown in FIG. 3), a runner member 50, and lower brackets 60 (of four total, one is shown in FIG. 3).

FIG. 4 is a view similar to that of FIG. 3, except that the dispensing bracket assembly 10 is in its fully open (aka "extended" and/or "working") position, and the cross sections of flexible tubing material 6 loaded thereon are shown in dotted line. In this view, not all of the elements of the assembly 10 are shown, but two of the four piping support legs 30 are shown, and two of the four piping support legs 30 are shown.

FIG. 5A shows a dispensing bracket assembly 10 in its fully open position, ready to be loaded with flexible material. This position may also be referred to as the "extended" and/or "working" position. The bracket assembly 10 is configured in this position to be free standing when placed on level ground such as level ground surface 8. This is a significant advantage in that this allows a coiled bundle of flexible material 6 to be then installed such that the central opening of the coiled material 6 is loaded onto the assembly 10 as shown in FIG. 5B. Once the material is in place as shown in FIG. 5B, the bracket assembly 10 may be attached to an overhead supporting member such as provided by a typical support vehicle described elsewhere. As the bracket assembly 10 is rotationally mounted to said overhead supporting member by a swivel configuration, it may rotate around a swivel rotation axis SRA such that the dispensable flexible material may be dispensed as shown.

FIGS. 9A-9C show how the opening and closing of the dispensing bracket assembly 10 is done in a manner similar to that of a conventional rain umbrella frame. By moving the runner member (not numbered in FIGS. 9A-9C) along the length of the hanger member 20, the assembly 10 can be opened from its closed (aka retracted) position in FIG. 9A, to the partially open position in FIG. 9B, to the fully open position in FIG. 9C. Said another way, it may be seen that the support legs (aka radial support members) are each retractably mounted relative to said central frame member in a mechanically interconnected manner such that all support legs (aka radial support members) extend and retract at the same time.

FIG. 20 is a view of the dispensing bracket assembly 110 in a partially folded configuration, showing the nature in which the dispensing bracket assembly 110 may be folded into a relatively compact configuration in order to be stored or shipped.

FIGS. 21A and 21B are figures related to FIG. 20, in that they are more detailed views of the right and left side connecting assemblies as they connect the members 110, 120, and 130. FIG. 21A is a more detailed view of a leftmost portion of FIG. 20, and FIG. 21B is a more detailed view of a rightmost portion of FIG. 20.

FIG. 23A is a more detailed view of a leftmost portion of FIG. 22, and FIG. 23B is a more detailed view of a rightmost portion of FIG. 22.

FIGS. 24A-B are sequential illustrative views of a coiled bundle of dispensable flexible material 106 being loaded onto the dispensing bracket assembly 110. Under one configuration, the right arm member 140 is moved into a configuration such as shown in FIG. 24A such that the coiled bundle of flexible material 106 may be slid onto the right arm member 140. This sliding is continued such as the coiled bundle of flexible material 106 may be slid further until it is in the position shown in FIG. 24B, in which it is loaded onto the central hanging member 120. At this point, the right arm member 140 may be pivoted from the position in FIG. 24A to the position shown in FIG. 24B.

FIG. 25 is an illustrative view showing how the central hanger member is "sandwiched" between the other two arm members, when the bracket assembly 110 is fully folded into its storage configuration as shown in FIG. 22.

DETAILED DESCRIPTION

Introduction

Figure 1:
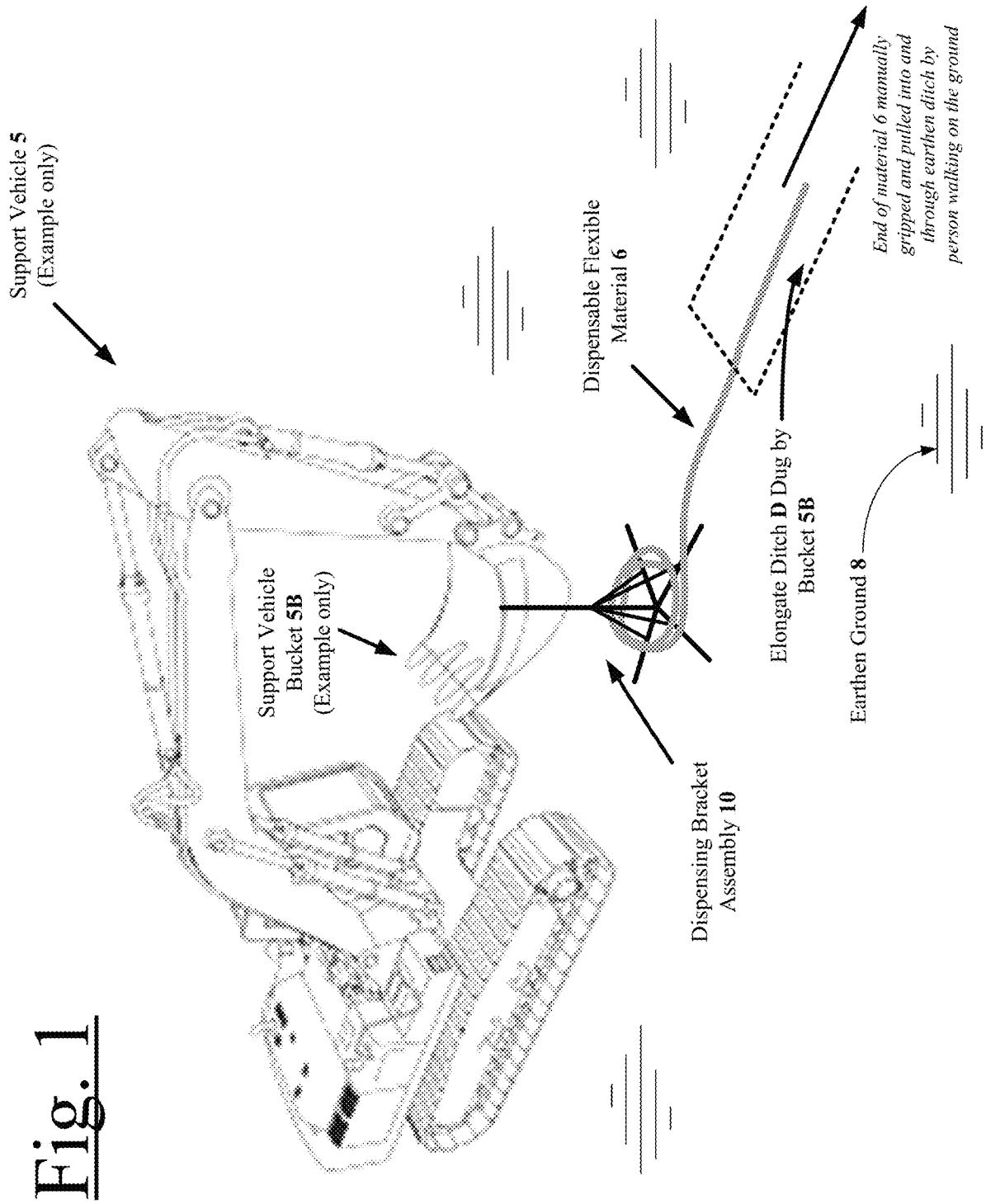
FIG. 1 is an illustrative drawing showing the dispensing bracket assembly 10 mounted to and supported by a typical support vehicle 5 (in this case an excavator, but other bucket-type vehicles are contemplated). The dispensing bracket assembly 10 is attached to the bucket 5B of the support vehicle 5, with its upper end engaging and being supported by an upper edge of a side wall of the bucket 5B or by other means discussed later. The dispensing bracket assembly 10 is configured to support a coiled bundle of dispensable flexible material 6 which may be stored in coiled form but dispensed into an elongate configuration such as in an elongate ditch D in earthen ground or the like, in one configuration by use of a human manually grasping the free end of the dispensable material (see FIG. 5B) and pulling it into and through the ditch while the person is walking on the earthen ground and while the support vehicle (including the bucket 5B proximate the end of the ditch D defined by the earthen ground) is stationary.

The present invention now will be described more fully hereinafter with reference to the accompanying drawings, in which some, but not all embodiments of the inventions are shown. This invention may be embodied in many different forms and should not be construed as limited to the embodiments set forth herein; rather, these embodiments are provided so that this disclosure will satisfy applicable legal requirements. Like numbers refer to like elements throughout.

Reference is now made to the figures, in which like elements indicate like elements throughout the several views.

ELEMENT LIST

Here is a list of the various elements:
5 Support Vehicle
5B Support Vehicle Bucket
6 Dispensable Flexible Material
8. Level ground
10. Dispensing Bracket Assembly
20. Central Hanger Member
30. Pivoting Piping support leg (4 in total)(aka radial support members)
40. Stretcher Member (4 in total)
50. Runner Member
  51 Flanges (4 in total)
60. Lower Brackets (4 in total)
70. Swivel Connector
  SRA Swivel Rotational Axis
105 Support Vehicle
105B Support Vehicle Bucket
5BSW Bucket Side Walls (2)
106 Dispensable Flexible Material
110. Dispensing Bracket Assembly
120. Central Hanger Member
  122 body
  124 left side hinge end
  126 right side hinge end
130. Left Arm Member
  132 body
  134 hook end
  136 hinge end
140. Right Arm Member
  142 body
  144 hook end
  146 hinge end
  148 pivot axis
150. Left Side Connecting Assembly
  152 machine screw
  154 hex nut 156 washers
158 pivot axis
160. Right Side Connecting Assembly
162 machine screw
164 hex nut
166 washers
168 pivot axis

DETAILED DISCUSSION

First Embodiment 10

Basic Construction and Operation

The present invention relates to a unique and improved hanging bracket which may be assembled on a construction job site in order to allow such materials to be dispensed along with the use of typical onsite construction vehicles such as backhoes, bucket loaders, etc. This configuration allows for effective attachment to various bucket sizes, and also may be folded into a compact configuration when stored or transported.

Most generally speaking, a dispensing bracket assembly 10 is configured to be hung by a swiveling connection so that it can dispense flexible material 6 from a coiled form into a linear form. The assembly 10 is similar in folding and unfolding operation to a rain umbrella framework in that it can be opened and closed (aka extended and retracted) as desired.

Reference is first made to FIG. 1, which shows the dispensing bracket assembly 10 mounted to and supported by a typical support vehicle 5 (in this case a backhoe, which includes an excavator), but other bucket-type vehicles are contemplated). The dispensing bracket assembly 10 is attached to the bucket 5B of the support vehicle 5, with its upper end engaging an upper edge of a side wall of the bucket 5B, or alternately, a tooth of the bucket. The dispensing bracket assembly 10 is configured to support a coiled bundle of dispensable flexible material 6 which may be stored in coiled form but dispensed into an elongate configuration such as in an elongate ditch or the like, in one configuration by use of a human manually grasping the free end of the dispensable material and pulling it into and through the ditch while the person is walking on the earthen ground and while the support vehicle (including the bucket proximate the end of the ditch defined by the earthen ground) is stationary. Use on a different bucket is shown in FIG. 2.

FIG. 3 shows a portion of a dispensing bracket assembly 10 as it might be viewed in suspension from a typical supporting bucket 5B. The dispensing bracket assembly 10 includes a central hanger member 20, four pivoting piping support legs 30 (of four total, one is shown in FIG. 3), stretcher members 40 (of four total, one is shown in FIG. 3), runner member 50, and lower brackets 60 (of four total, one shown in FIG. 3). The bracket assembly 10 is shown with certain members in two positions—the position shown in solid line is a position intermediate the open and closed position, and the position shown in dotted line is the open (extended) position. It should be understood that the elongate members 20, 30, and 40 have their own longitudinal axes and include transverse cross sections which can be square, round, or other suitable shapes).

FIG. 4 is a view similar to that of FIG. 3, except that the dispensing bracket assembly 10 is in its open position (aka dispensing, unloading, or extended position), and the cross sections of dispensable flexible material 6 (such as tubing) loaded thereon are shown in dotted line. In this view, not all of the elements of the assembly 10 are shown, but two of the four piping support legs 30 (aka radial support members) are shown, and two of the four piping support legs 30 are shown. Also shown is a swivel connector 70, which provides a secure but pivoting connection to an overhead support (such as a bucket 5, shown elsewhere) which allows the central hanger member 20 to freely rotate about its own longitudinal, vertical, axis, referred to as the Swivel Rotation Axis SRA. This rotation allows the unrolling (aka dispensing, or unloading) of the flexible material 6 from the dispensing bracket assembly 10.

It may be understood that the tubing 6 when loaded is coiled around the longitudinal axis of the central hanger member 20, and is supported by the combination of the four piping support legs 30 and the four stretcher members 40 as shown.

It may also be understood that by attaching the dispensing bracket assembly 10 to the bucket of a supporting vehicle 5, and by threading a coiled bundle of dispensable flexible material 6 around the longitudinal axis of the central hanger member 20 and onto the four pivoting support members 30, the flexible material 6 may be dispensed off of the four pivoting piping support legs 30 as the central hanger member rotates about its longitudinal axis via the swivel connector 70. This may be done by pulling the flexible material off the dispensing bracket assembly 10 while it is stationary, or alternately the free end of the flexible material could be held in place while the supporting vehicle moves away therefrom while the flexible material is peeled off of its coiled bundle. The boom(s) of the supporting vehicle may also be manipulated in order to particularly place or orient the bucket and thus the material 6.

The opening and closing (aka extending and retracting) of the dispensing bracket assembly 10 is done in a manner similar to that of a conventional rain umbrella frame. By moving the runner member 50 along the length of the hanger member 20, the assembly can be opened from its closed position in FIG. 9A to the partially open position in FIG. 9B, to the fully open position in FIG. 9C.

Detailed Construction

Reference is now made FIGS. 3 and 4, which focus upon the elements in the dispensing bracket assembly 10.

The dispensing bracket assembly 10 includes the following components:

Central hanger member 20
Pivoting piping support legs 30 (four in total)
Stretcher members 40 (four in total)
Runner Member 50 (with four flanges 51)
Lower Bracket 60
Swivel Connector 70
Loop Member 80

The central hanger member 20 is elongate and is substantially vertical when in use. In one configuration it is made of square 1" tubing, although other configurations are contemplated without departing from the spirit and scope of the present invention. When in its use position, it may be understood to have an upper and a lower end, each of which oppose the other.

The four pivoting piping support legs 30 each have their lower ends pivoting from the bottom section of the central hanger member 20, such that they each may pivot as shown in FIG. 3 from the solid line position to the dotted line position. The position shown in solid line is a position intermediate the open and closed position, and the position shown in dotted line is the fully open position.

Figure 6:
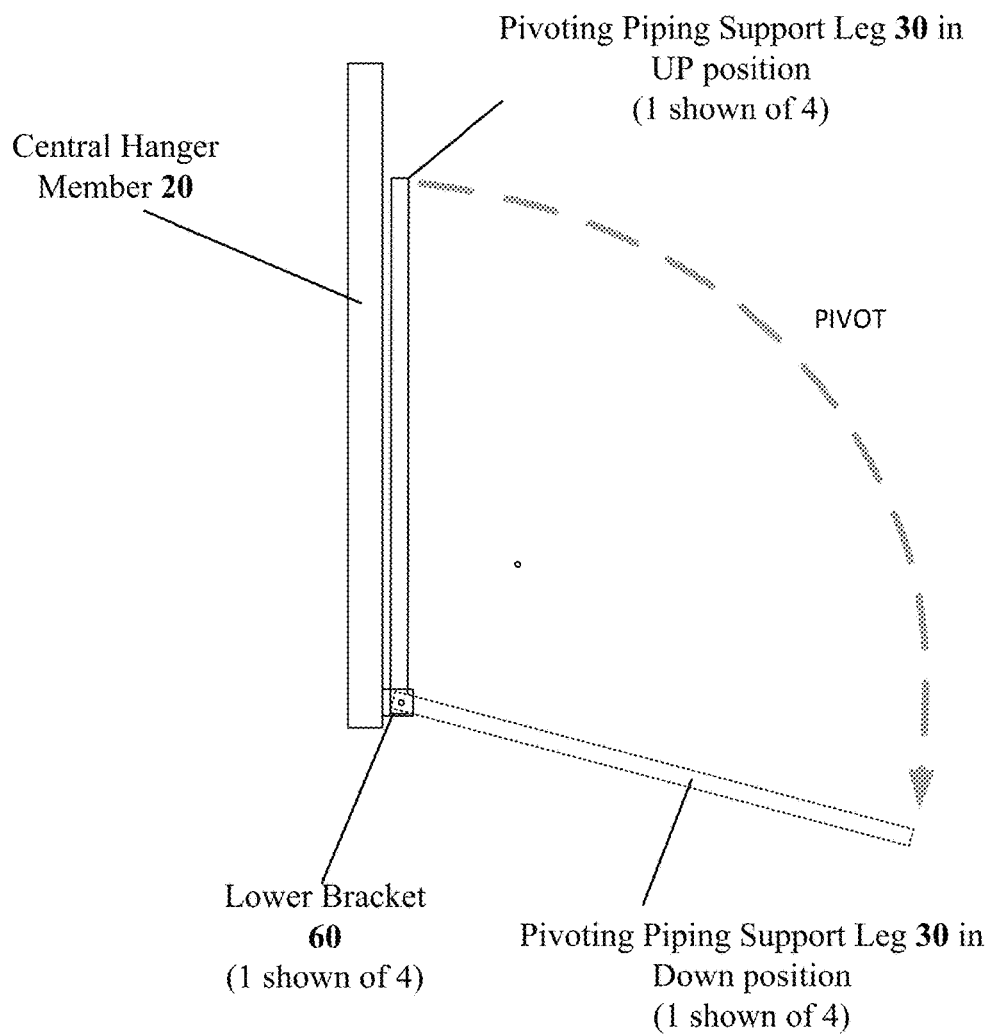
FIG. 6 shows a part of the dispensing bracket assembly 10, showing the central hanger member 20 and one pivoting piping support leg 30, as well as a lower bracket 60, which is rigidly attached to the lower end of the bracket assembly 10, and provides a pivoting connection between itself and one end of the pivoting piping support leg 30, such that the other, free, end of the pivoting piping support leg 30 may pivot as shown by the dotted arrow in FIG. 6.

The fully closed and open positions (aka extended and retracted positions) of the pivoting piping support legs 30 relative to the central hanger member 20 are shown in FIG. 6, which is shows a part of the dispensing bracket assembly 10, showing the central hanger member 20 and one pivoting piping support leg 30, as well as a lower bracket 60, which is rigidly attached to the lower end of the bracket assembly 10, and provides a pivoting connection between itself and one end of the pivoting piping support leg 30, such that the other, free, end of the pivoting piping support leg 30 may pivot as shown by the dotted arrow in FIG. 6.

Figure 7:
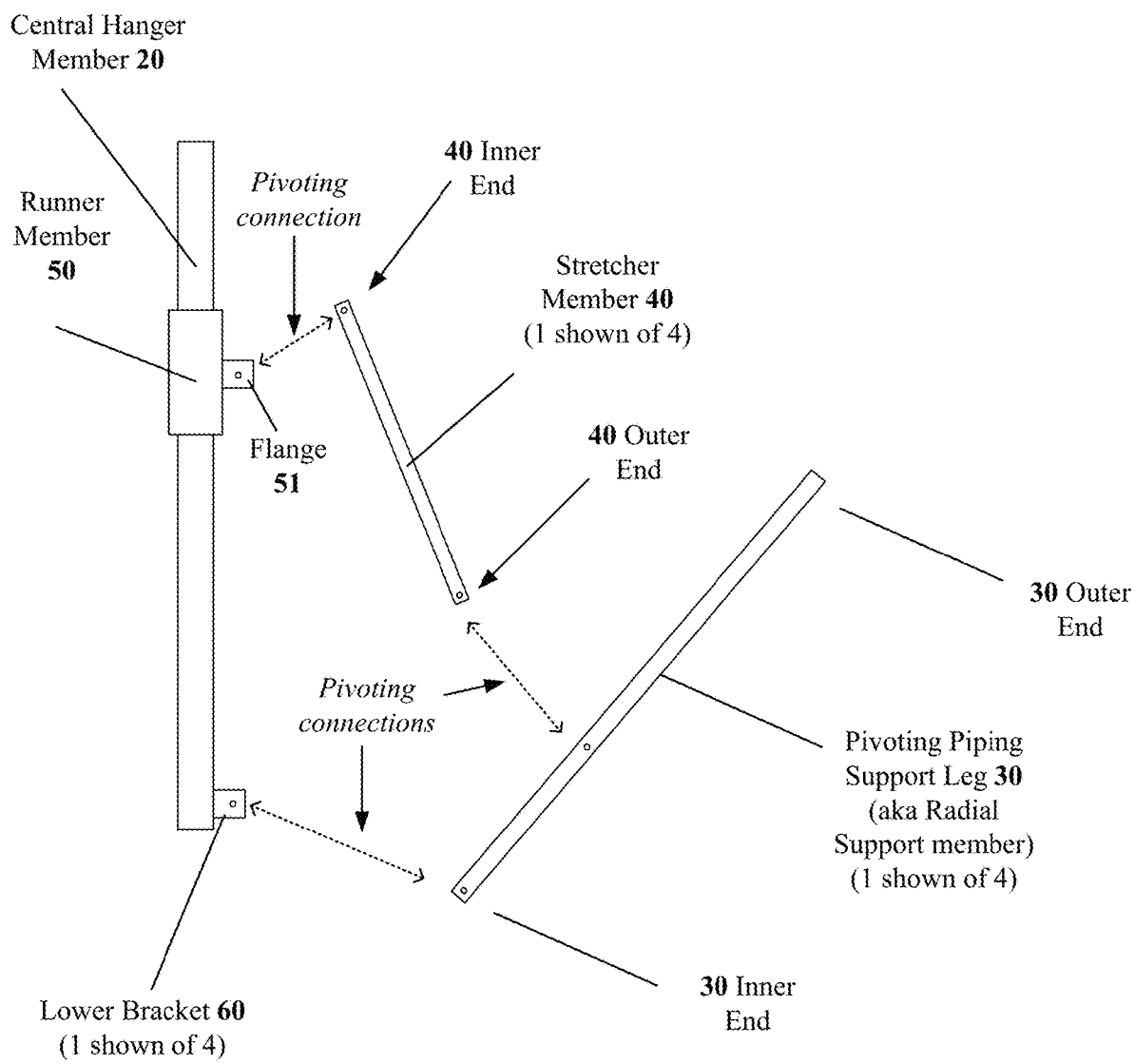
FIG. 7 is a front plan view of a portion of the dispensing bracket assembly 10, showing the various pivoting connections between certain elements. One pivoting connection is between the inner end of the stretcher member 40 and a corresponding flange 51 of the runner member. Another pivoting connection is between the outer end of the stretcher member 40 and a pivot point along the length of a corresponding piping support leg 30. Another pivoting connection is between the outer end of the stretcher member 40 and a pivot point along the length of a corresponding piping support leg 30.
Figure 8:
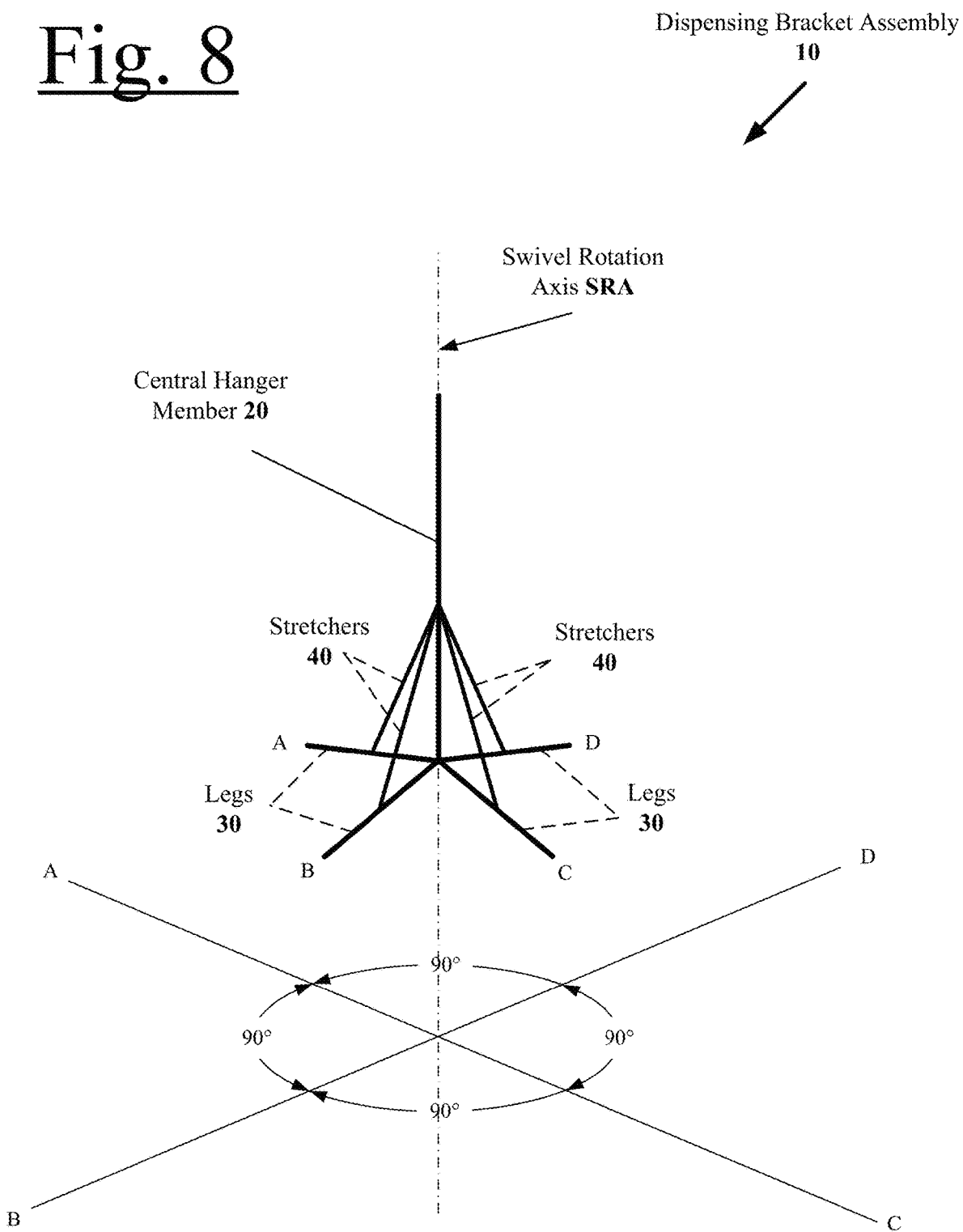
FIG. 8 is an illustrative view showing the manner in which the four piping support legs 30 extend 90 degrees radially in four directions relative to the central longitudinal axis (aka the swivel rotation axis SRA) of the central hanger member. This view likewise shows the similar manner in which the four stretcher members 40 extend 90 degrees radially in four directions relative to the central longitudinal axis of the central hanger member. For example, support leg 30A extends radially but generally within a plane that includes line AC and rotation axis SRA. Support leg 30B extends radially but generally within a plane that includes line BD and rotation axis SRA. Support leg 30C extends radially but generally within a plane that includes line AC and rotation axis SRA. Support leg 30D extends radially but generally within a plane that includes line BD and rotation axis SRA. As may also be understood that legs 30A and 30C lie in a common plane which is perpendicular to a plane including legs 30B and 30D. The manner in which certain elements such as the stretchers and legs extend in equidistant spacings around the center axis SRA will be referred to in this application as a "9001180012700l3600 spacing" to describe the orientation of such elements about a 360 degree range about the axis.
Figure 10:
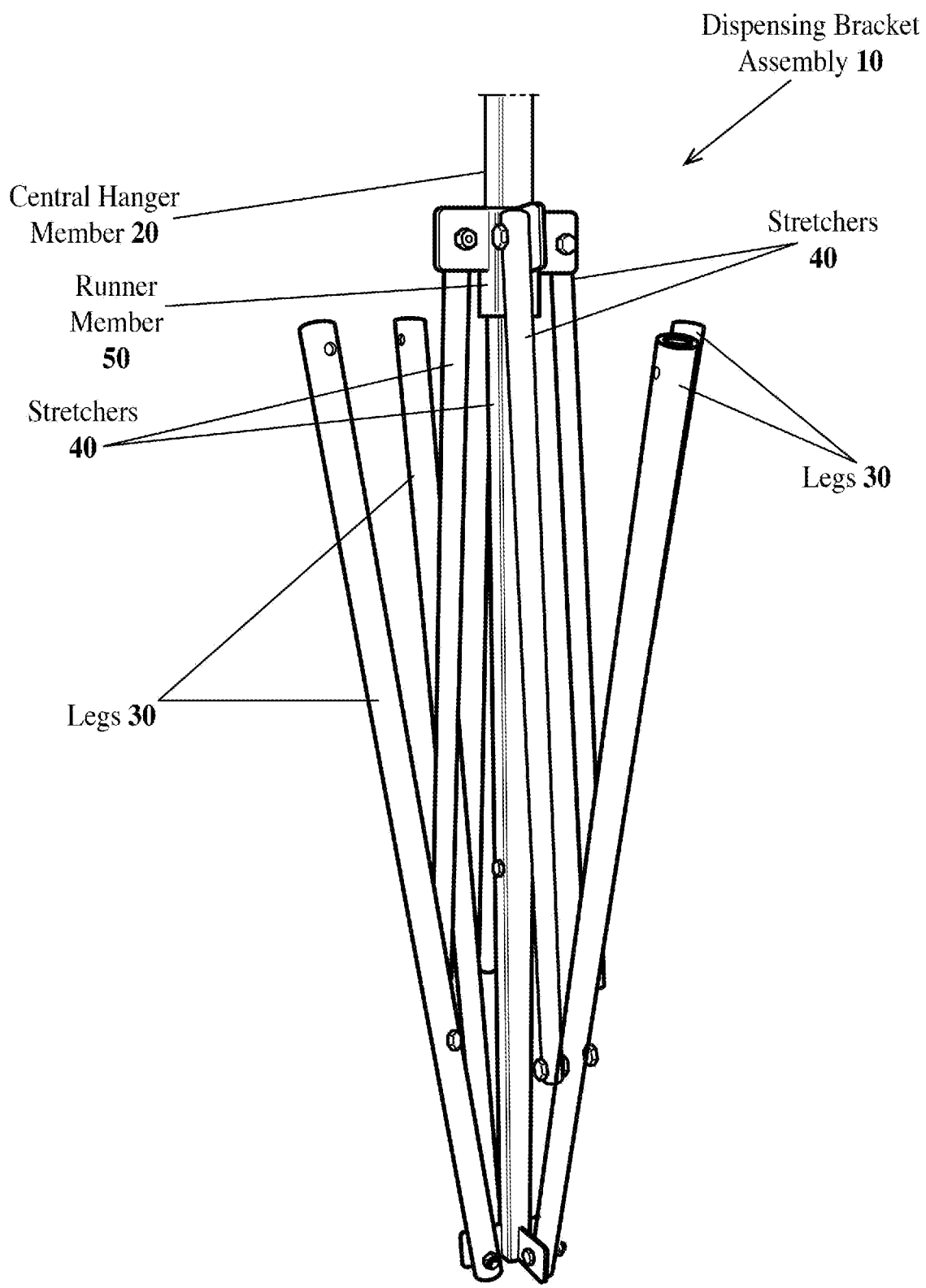
FIG. 10 shows the dispensing bracket assembly 10 in a slightly open configuration.
Figure 11:
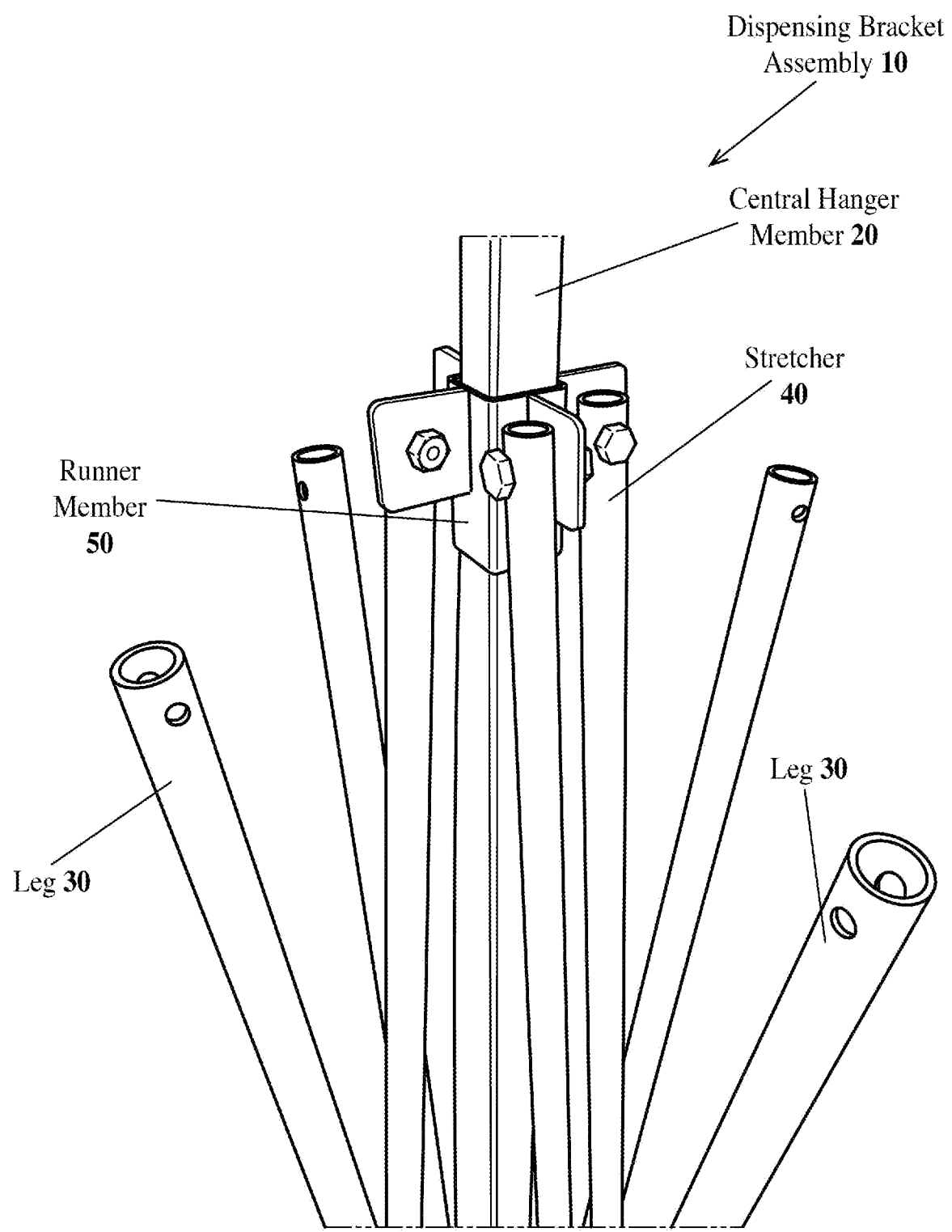
FIG. 11 is a partial, closer view of FIG. 10, showing how the square tube of the runner member 50 fits around the central hanger member 20.
Figure 12:
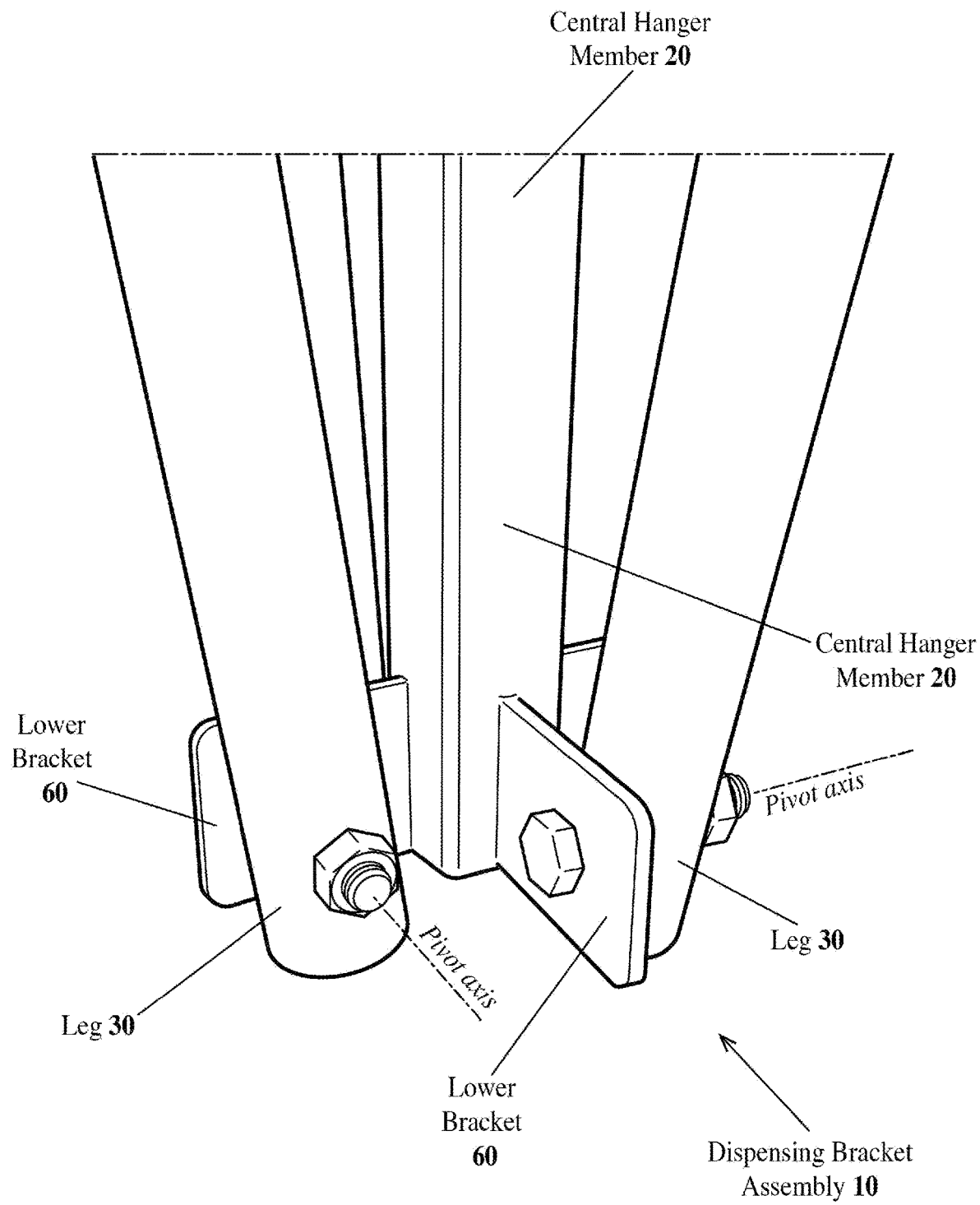
FIG. 12 is a partial, closer view of FIG. 10, focusing on the bottom of the unit, and showing how the brackets 60 hold the inner ends of the legs 30 in a pivoting manner about pivot axes.

Referring now also to FIG. 7, each of the four stretcher members 40 has one end, its inner end, pivotably attached to a corresponding flange of the runner member 50, and each has the other end, its outer end, pivotably attached to a corresponding pivoting piping support leg 30 at a location intermediate its two ends. Said another way, it may be seen that each of the four pivoting support members 30 has a respective stretcher member 40 pivotably attached thereto.

Continuing to refer to FIG. 7, the runner member 50 is configured to act as a sliding sleeve which fits around the cross section of the central hanger member 20, and slides up and down a length of the central hanger member 20. The runner member 50 includes four outwardly-directed flanges 51, each of which are rigidly attached to the body of the runner member 50. Each of the four outwardly-directed flanges 51 is attached to an inner end of a corresponding one of the four stretcher members 40.

Continuing to refer to FIG. 7, the lower brackets 60 (four in total) are attached to the outside of the lower end of the hanger member in a 90°/180°/270°/360° spacing configuration. Each of the lower brackets 60 is pivotably attached to the inner end of a corresponding piping support leg 30, such as one pivoting connection shown in FIG. 7.

The swivel connector 70 such as shown in FIG. 4 provides a rotating and/or pivoting connection between the bracket assembly 10 and an overhead supporting member. This is provided by a swivel configuration, allowing the bracket assembly 10 to rotate around a swivel rotation axis SRA such that the dispensable flexible material may be dispensed as shown.

Attachment to Supporting Vehicle

It may be understood that there are many different ways the upper end of the central hanger member 20 of the bracket assembly 10 may be attached to an overhead supporting element such as a bucket of a support vehicle.

Under one way to attach the dispensing bracket assembly 10 to the bucket of a supporting vehicle, the bracket assembly 10 may be manipulated generally to the position shown in FIG. 1, and then the upper end of the swivel connector 70 may be attached via a hook or other similar connecting means over the side wall of a typical bucket 5B. The bracket assembly 10 can then freely hang.

Figure 13:
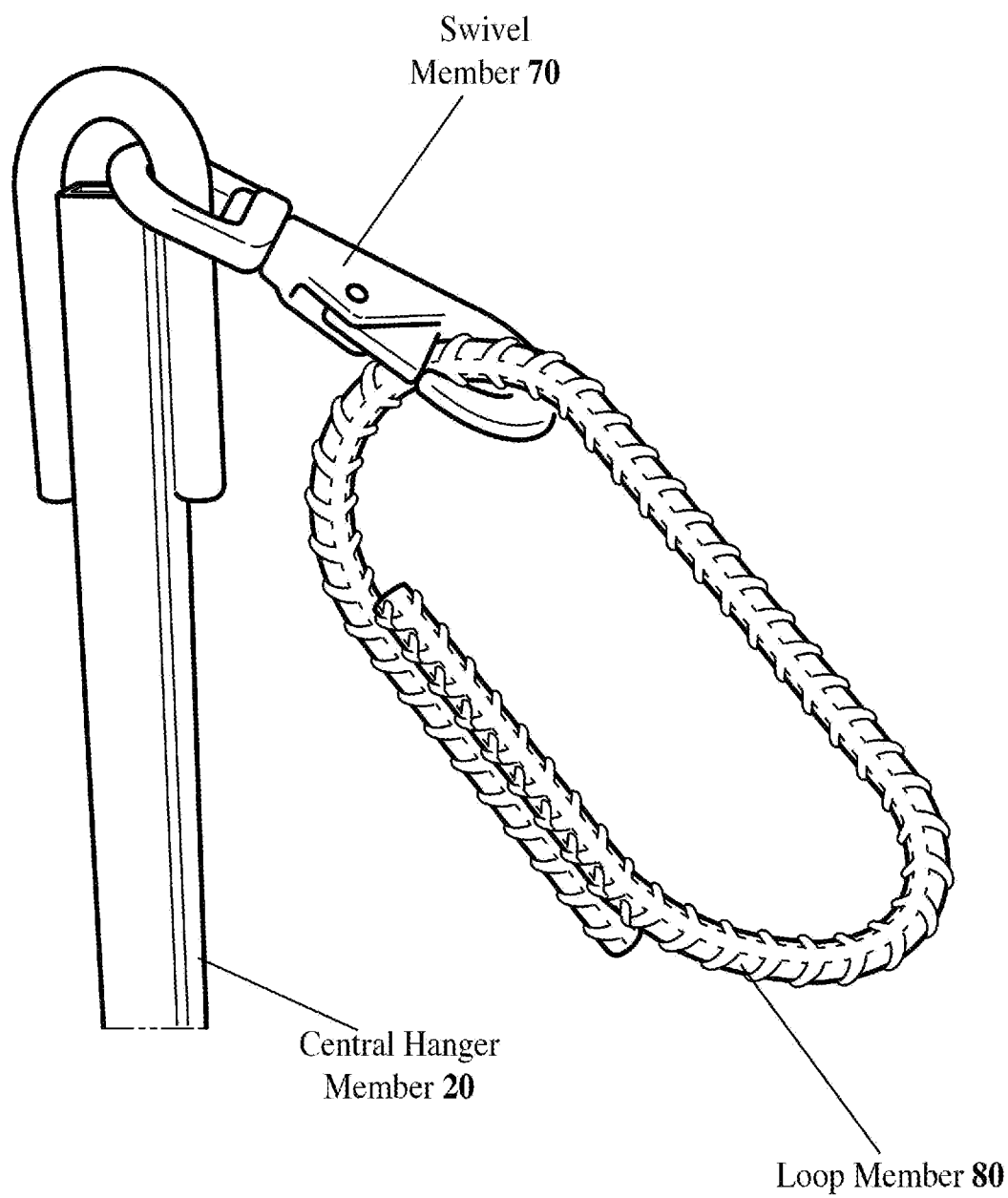
FIG. 13 shows the use of a closed hoop member 80 which may be attached to the upper end of the swivel connector 70. This loop 80 may fit around an extending tooth of a bucket of a support vehicle to attach the upper end of the swivel connector 70 to the bucket of a support vehicle as needed.

Alternatively, FIG. 13 shows the use of a closed hoop member 80 which may be attached to the upper end of the swivel connector 70. This loop 80 may fit around an extending tooth of a bucket of a support vehicle to attach the upper end of the swivel connector 70 to the bucket of a support vehicle as needed.

Loading of Bundle of Flexible Material

Figure 5A:
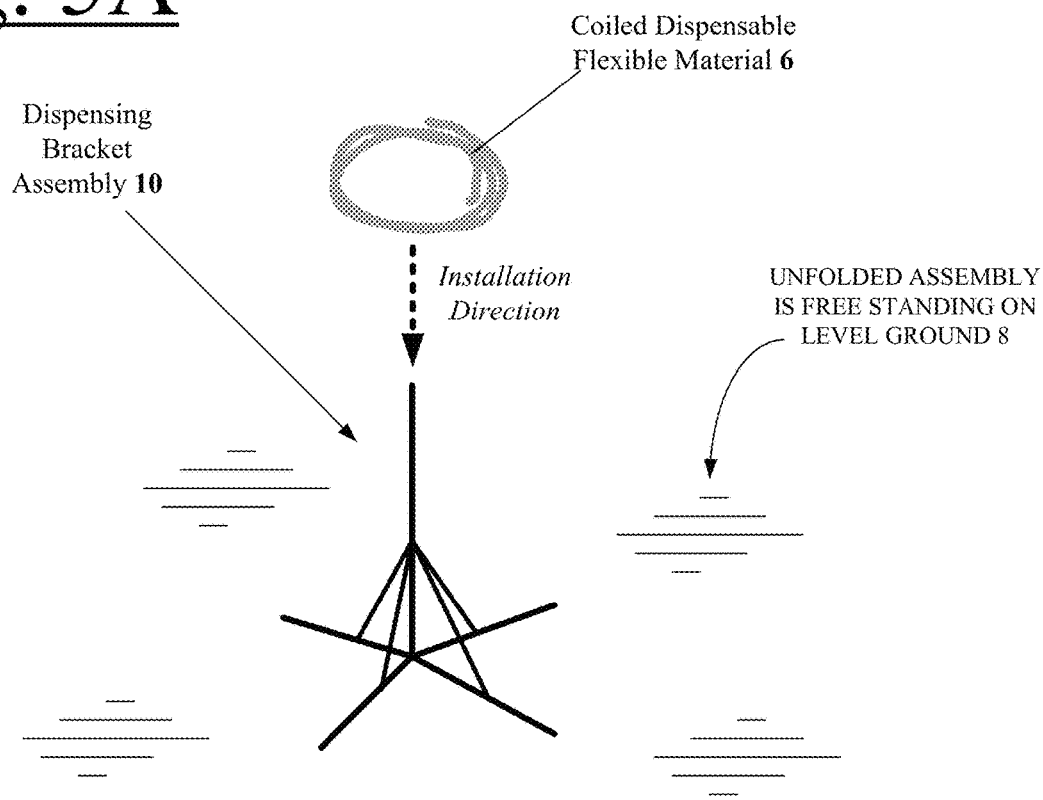
FIGS. 5A and 5B are illustrative sequential step views showing the loading of a coiled bundle of flexible material 6 being loaded onto the dispensing bracket assembly 10.
Figure 5B:
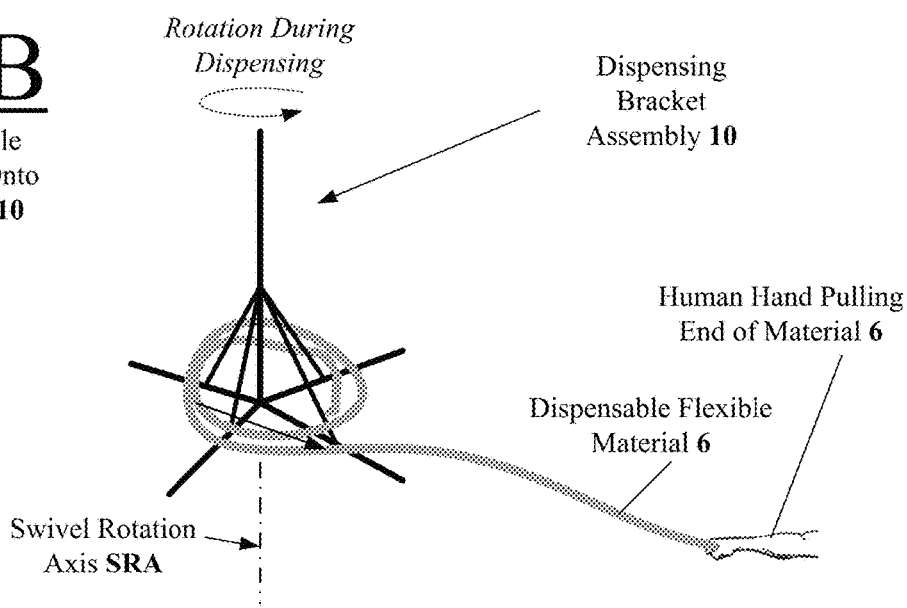

To describe the loading of the dispensing bracket assembly 10, reference is now made to FIGS. 5A-5B, which are sequential illustrative views of a coiled bundle of dispensable flexible material 6 being loaded onto the dispensing bracket assembly 10.

FIGS. 5A and 5B are illustrative sequential step views showing the loading of a coiled bundle of flexible material 6 being loaded onto the dispensing bracket assembly 10. FIG. 5A shows a dispensing bracket assembly 10 in its fully open position, ready to be loaded with flexible material. This position may also be referred to as the "extended", "working", or "loading" position. The bracket assembly 10 is configured in this position to be free standing when placed on level ground such as level ground surface 8. This is a significant advantage in that this allows a coiled bundle of flexible material 6 to be then installed such that the central opening of the coiled material 6 is loaded onto the assembly 10 as shown in FIG. 5B. Once the material is in place as shown in FIG. 5B, the bracket assembly 10 may be attached to an overhead supporting member such as provided by a typical support vehicle described elsewhere. As the bracket assembly 10 is rotationally mounted to said overhead supporting member by a swivel configuration, it may rotate around a swivel rotation axis SRA such that the dispensable flexible material may be dispensed as shown.

Dispensing of Flexible Material

Once the dispensing bracket assembly 10 is attached to the bucket of a supporting vehicle, and a coiled bundle of flexible material 6 is threaded onto the central hanger member 20, the flexible material may be dispensed off of the central hanger member 20. This may be done by pulling the flexible material off the dispensing bracket assembly 10 while it is stationary, or alternately the free end of the flexible material could be held in place while the supporting vehicle moves away therefrom while the flexible material is peeled off of its coiled bundle.

During the dispensing process, it may be understood that the assembly 10 rotates about a vertical axis as shown in the dotted arrow in FIG. 5B. thus "spooling off" the material from the coiled bundle. This axis may be stationary if the supporting vehicle is stationary, or the axis may be moving in spatial translation if the supporting vehicle is moving.

The dispensing bracket assembly 10 is configured to support a coiled bundle of dispensable flexible material 6 which may be stored in coiled form but dispensed into an elongate configuration such as in an elongate ditch or the like, in one configuration by use of a human manually grasping the free end of the dispensable material and pulling it into and through the ditch while the person is walking on the earthen ground and while the support vehicle (including the bucket proximate the end of the elongate ditch defined by the earthen ground) is stationary.

Storage and Transport

FIGS. 9A-9C show how the opening and closing of the dispensing bracket assembly 10 is done in a manner similar to that of a conventional rain umbrella frame. By moving the runner member (not numbered in FIGS. 9A-9C) along the length of the hanger member 20, the assembly 10 can be opened from its closed (retracted) position in FIG. 9A to the partially open position in FIG. 9B, to the fully open (extended) position in FIG. 9C.

The assembly may be used in the fully open (extended) position of FIG. 9C, and stored in the closed (retracted) position of FIG. 9A.

Dispensable Flexible Materials

It may be understood that the coiled bundle of flexible material 6 shown in FIG. 5A is coiled about its open center hole, which is typical of the manner of sale of flexible material such as for example 4"-6" corrugated drainpipe, which is a flexible material, built with alternating ridges and grooves. Such corrugated drainpipe is typically coiled from discrete lengths of pipe into a coiled, "donut-shaped", bundle that is held together by short lengths or rope or wire. These short lengths of rope or wire are located at several locations around the diameter of the donut shaped bundle, with the sole purpose of preventing the coiled material from unraveling during storage or transport to the job site. Once such a tied bundle is placed on the central hanger member of the present configuration, it is intended that the short lengths of tie wire or rope are removed in order to allow the coiled bundle of flexible material to be unraveled as needed.

It may be understood that the coiled bundle of material 6 is coiled around what could be understood as an open central hole having a longitudinal hole axis such as shown in FIG. 5A, said axis approximating the position of the longitudinal axis of the center hanger member when said flexible material is loaded onto the bracket assembly in an overlapping circular configuration about a central through hole such as shown in FIG. 5B.

Alternatively, the use of a coiled bundle of flexible material which is coiled around a central hub is also contemplated under this invention, such as would be used for electrical wiring or other such material.

The flexible material 6 may include coiled lengths of elongate materials such as wiring (electrical or fencing), flexible tubing, flexible drain or supply piping, or any other materials which can be coiled and/or stored on a spool.

Materials Types and Dimensions

Many different materials of different shapes and thicknesses may be used to comprise the individual elements described herein. The central hanger member 20 may be 1 inch square steel tubing, with the runner member 50 also being square steel tubing of a slightly larger size so as to allow the runner member 50 to slidably fit around the transverse cross section of the hanger 20 without relative rotation about their common longitudinal axes.

The stretcher members 40 may be square or round steel tubing.

The brackets may be steel plate stock.

Pivoting connections may be provided by conventional threaded elongate fasteners such as headed machine screws coupling with nuts.

Other materials and thicknesses may also be used to suit the particular environment and/or type of elongate material being dispensed. Such elongate dispensable materials may include electrical wiring (sheathed or unsheathed) various sizes of plastic tubing or conduit, or other suitable flexible materials which may be stored in a coiled state prior to dispensing. Depending on the duty needed, the size of the elements may be varied.

Advantages

Advantages of this system are many.

The free-standing nature of the bracket assembly 10 when in its open position is a significant advantage in that this allows a coiled bundle of flexible material 6 to be installed while the assembly 10 is free standing, allowing the central opening of the coiled material 6 t be loaded onto the assembly 10 as shown in FIGS. 5A and 5B. Once the material is in place as shown in FIG. 5B, the bracket assembly 10 may be attached to an overhead supporting member such as provided by a typical support vehicle described elsewhere.

The foldable nature of the assembly 10 as shown in FIGS. 9A-9C provides for a very compact configuration for storage or transport.

Second Embodiment 110

Basic Construction and Operation

The present invention relates to a unique and improved hanging bracket which may be assembled on a construction job site in order to allow such materials to be dispensed along with the use of typical onsite construction vehicles such as backhoes, bucket loaders, etc. This configuration allows for effective attachment to various bucket sizes, and also may be folded into a compact configuration when stored or transported.

Figure 14:
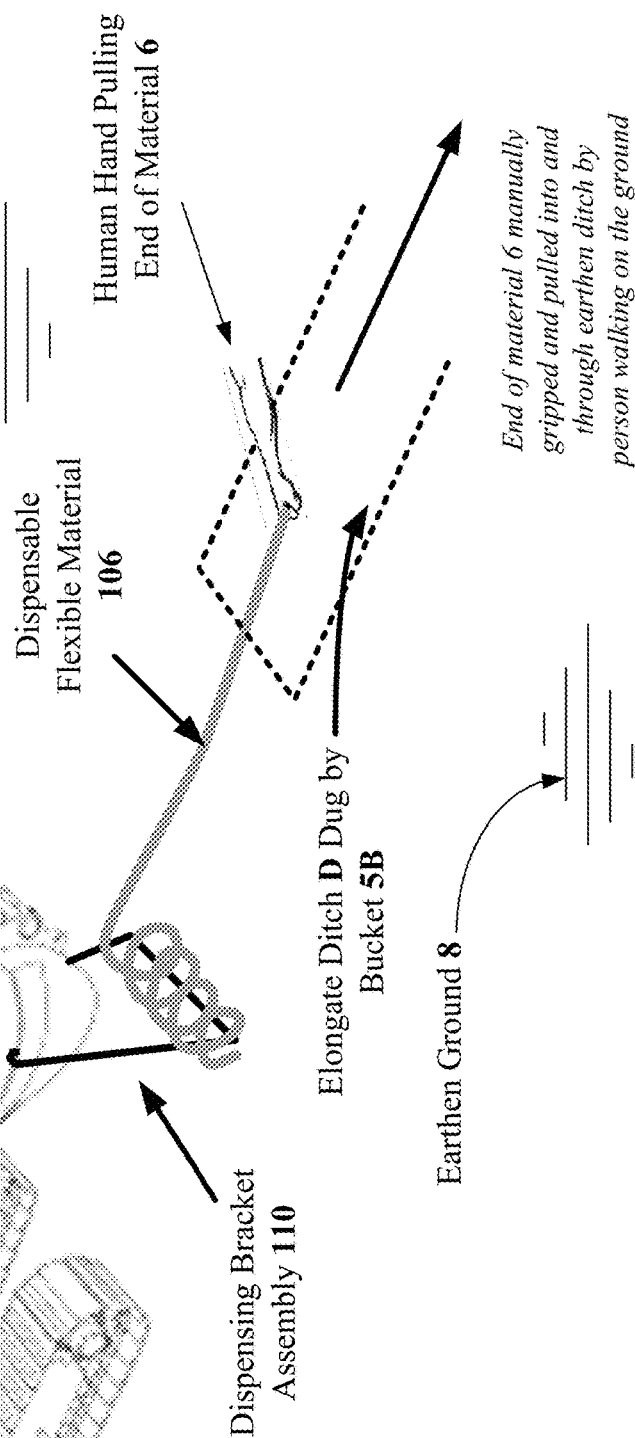
FIG. 14 is an illustrative drawing showing the dispensing bracket assembly 110 mounted to and supported by a typical support vehicle 105 ((in this case a backhoe, which includes an excavator), but other bucket-type vehicles are contemplated). The dispensing bracket assembly 110 is attached to the bucket 105B of the support vehicle 5, with its two downwardly-directed hooks engaging the upper edges of the parallel side walls of the bucket 105B. The dispensing bracket assembly 110 is configured to support a coiled bundle of flexible material 106 which may be stored in coiled form but dispensed into an elongate configuration such as in an elongate ditch or the like, in one configuration by use of a human manually grasping the free end of the dispensable material and pulling it into and through the ditch while the person is walking on the earthen ground and while the support vehicle (including the bucket proximate the end of the ditch defined by the earthen ground) is stationary.

Reference is first made to FIG. 14, which shows the dispensing bracket assembly 110 mounted to and supported by a typical support vehicle 105 (in this case an excavator, but other bucket-type vehicles are contemplated). The dispensing bracket assembly 110 is attached to the bucket 105B of the support vehicle 105, with its two downwardly-directed hooks engaging the upper edges of the side walls of the bucket 105B. The dispensing bracket assembly 110 is configured to support a coiled bundle of dispensable flexible material 106 which may be stored in coiled form but dispensed into an elongate configuration such as in an elongate ditch or the like, in one configuration by use of a human manually grasping the free end of the dispensable material and pulling it into and through the ditch while the person is walking on the earthen ground and while the support vehicle (including the bucket proximate the end of the ditch defined by the earthen ground) is stationary. Use on a different bucket is shown in FIG. 15.

Figure 15:
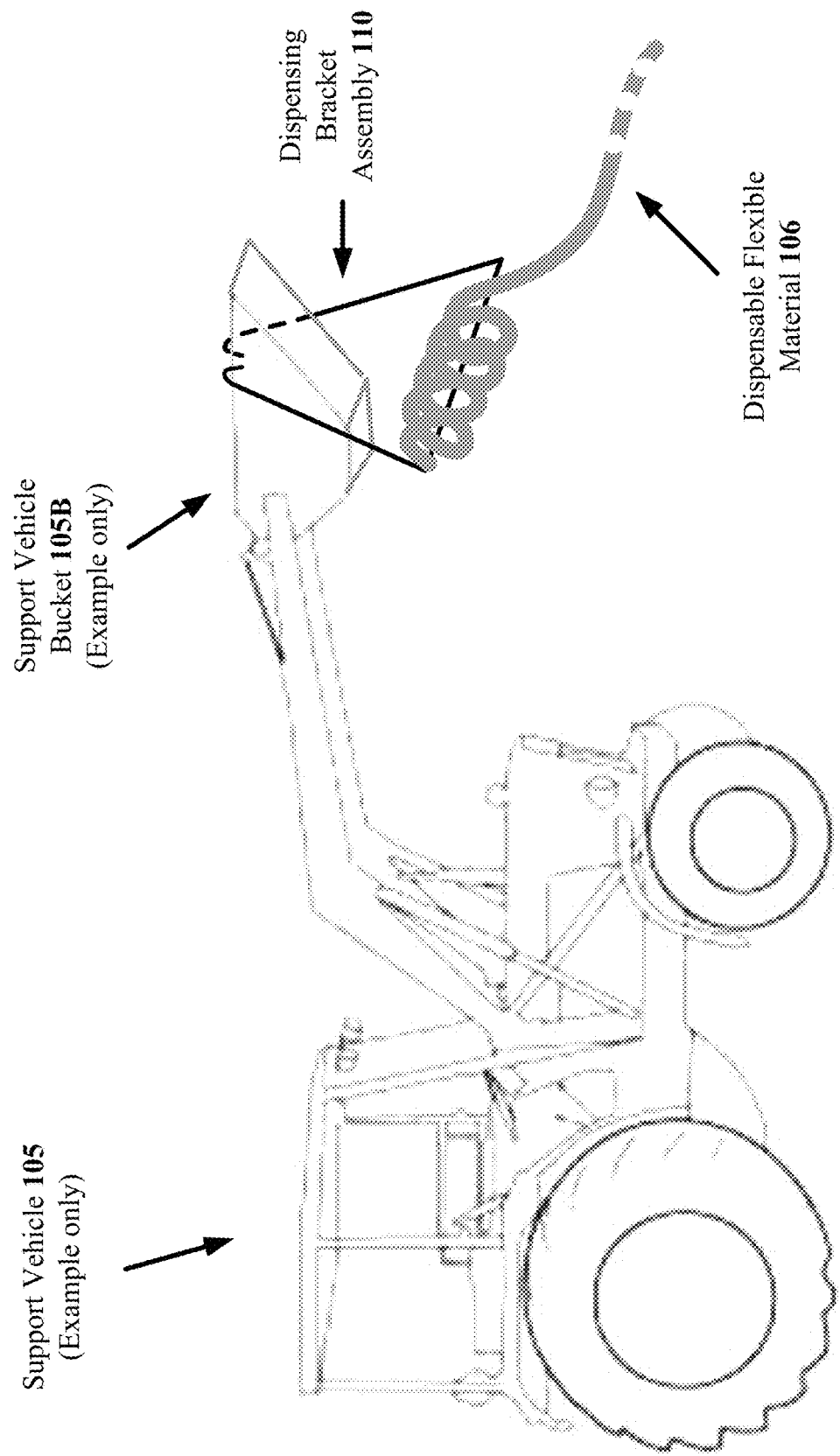
FIG. 15 is an illustrative drawing showing the dispensing bracket assembly 110 mounted to and supported by another typical support vehicle 105 (in this case a front end loader of a tractor or bulldozer, but other front bucket-type vehicles are contemplated). The dispensing bracket assembly 110 is attached to the bucket 105B of the support vehicle 105, with its two downwardly-directed hooks engaging the upper edges of the parallel side walls of the bucket 105B. The dispensing bracket assembly 110 is configured to support a coiled bundle of dispensable flexible material 106 which may be stored in coiled form but dispensed into an elongate configuration such as in an elongate ditch or the like, in one configuration by use of a human manually grasping the free end of the dispensable material and pulling it into and through the ditch while the person is walking on the earthen ground and while the support vehicle (including the bucket proximate the end of the ditch defined by the earthen ground) is stationary.

FIG. 15 shows a dispensing bracket assembly 110 as it might be viewed in suspension from a typical supporting bucket 105B, shown in dotted line. The dispensing bracket assembly 110 includes a central hanger member 120, a left arm member 130, right arm member 140, and left and right side connecting assemblies 150, 160, discussed elsewhere in more detail. Dispensable flexible material is not shown in this drawing, but it is to be supported by the central hanger member 120 as shown in FIGS. 14 and 15.

It may be understood that by attaching the dispensing bracket assembly 110 to the bucket of a supporting vehicle 105, and by threading a coiled bundle of dispensable flexible material 106 onto the central hanger member 120, the flexible material may be dispensed off of the central hanger member 120. This may be done by pulling the flexible material off the dispensing bracket assembly 110 while it is stationary, or alternately the free end of the flexible material could be held in place while the supporting vehicle moves away therefrom while the flexible material is peeled off of its coiled bundle. The boom(s) of the supporting vehicle may also be manipulated in order to particularly place or orient the bucket and thus the material 106.

Figure 16:
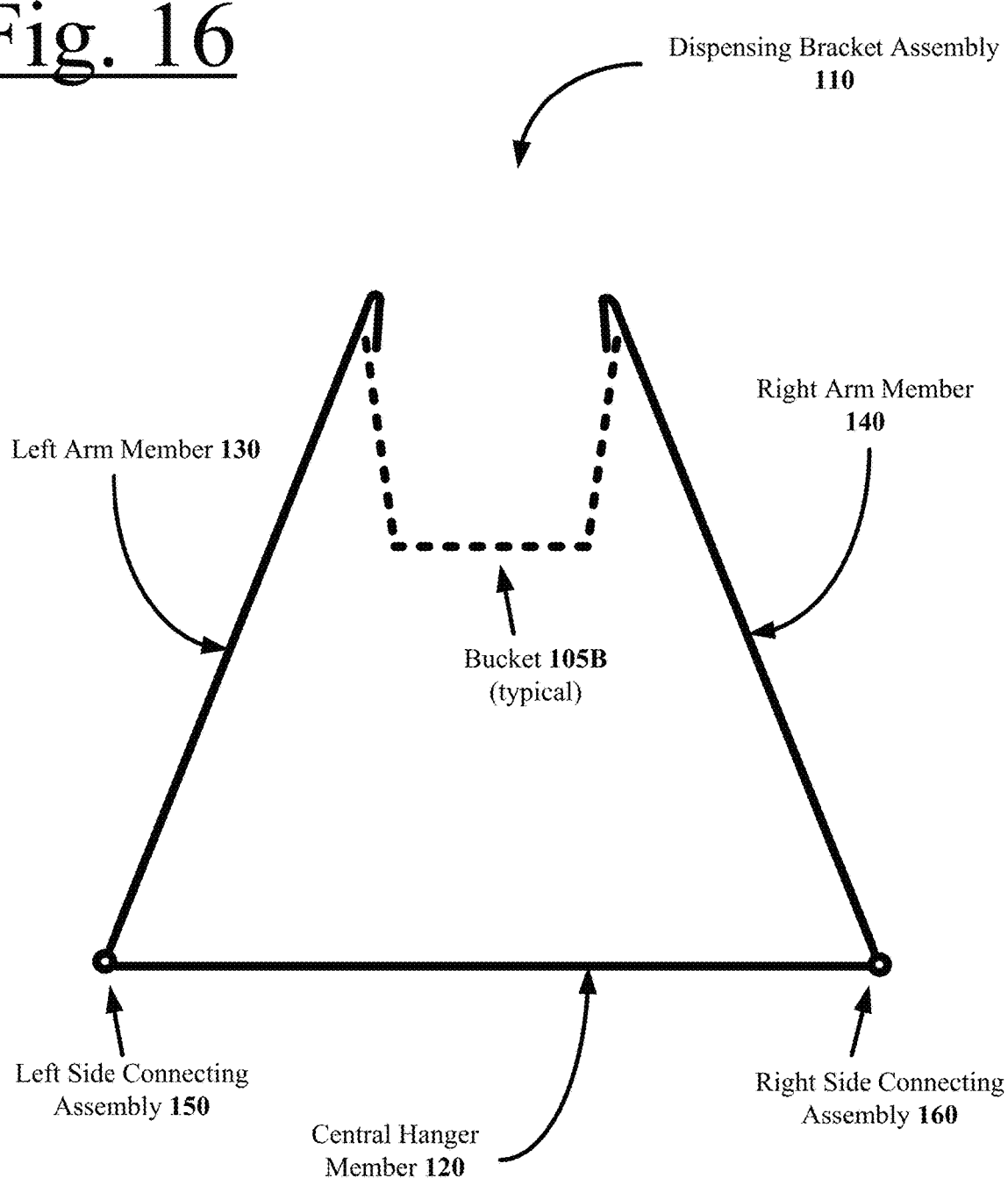
FIG. 16 is a front plan view of the dispensing bracket assembly 110 as it might be viewed in suspension from a typical supporting bucket 105B, shown in dotted line. The dispensing bracket assembly 110 includes a central hanger member 120, a left arm member 130, right arm member 140, and left and right side connecting assemblies 150, 160, discussed in more detail elsewhere.
Figure 22:
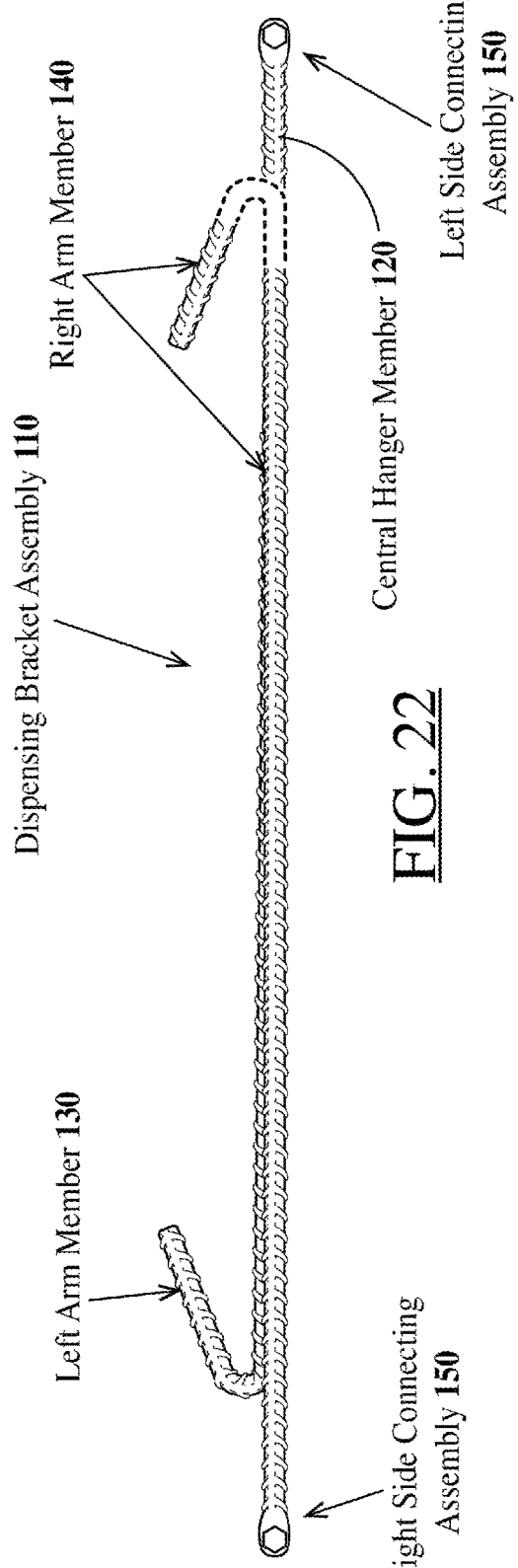
FIG. 22 is a view of the dispensing bracket assembly 110 in a completely folded configuration, showing the nature in which the dispensing bracket assembly 110 may be folded into a relatively compact configuration in order to be stored or shipped, with the central hanger member effectively "sandwiched" between the other two arm members. White dotted lines are shown in FIG. 22 to clarify the outer edges of one hook.
Figure 23B:
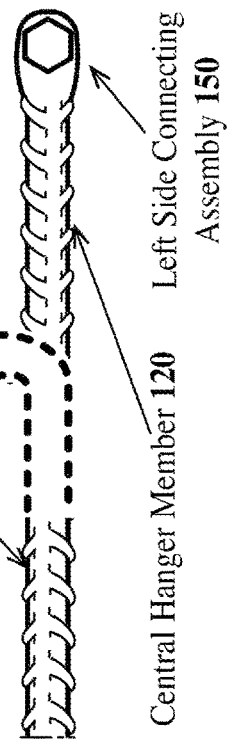
FIGS. 23A and 23B are figures related to FIG. 22, in that they are more detailed views of the right and left side connecting assemblies as they connect the members 110, 120, and 130.
Figure 23A:
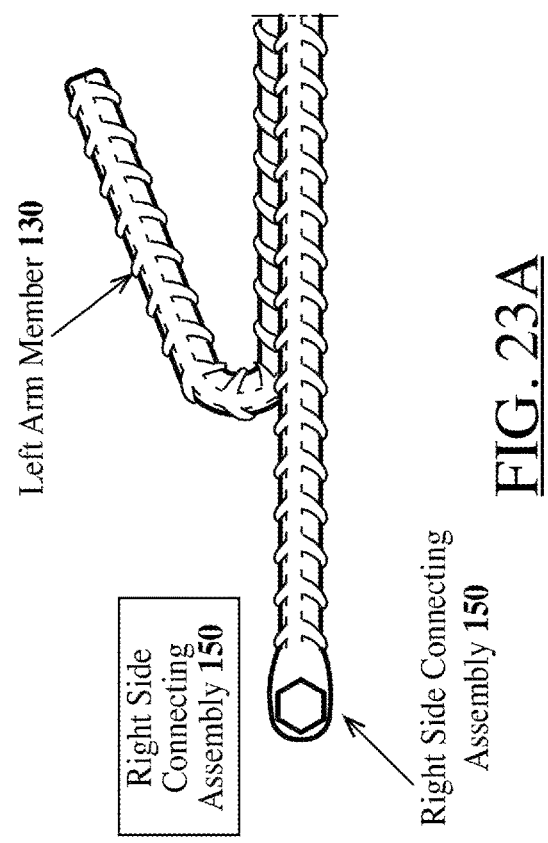

The dispensing bracket assembly 110 may be stored or shipped by converting it from the operating configuration shown in FIGS. 14-16 to a folded position. This folded position is shown in FIG. 22, in which the three elongate members 120, 130, and 140 are positioned in general parallel configurations and next to each other.

Detailed Construction

Figure 17:
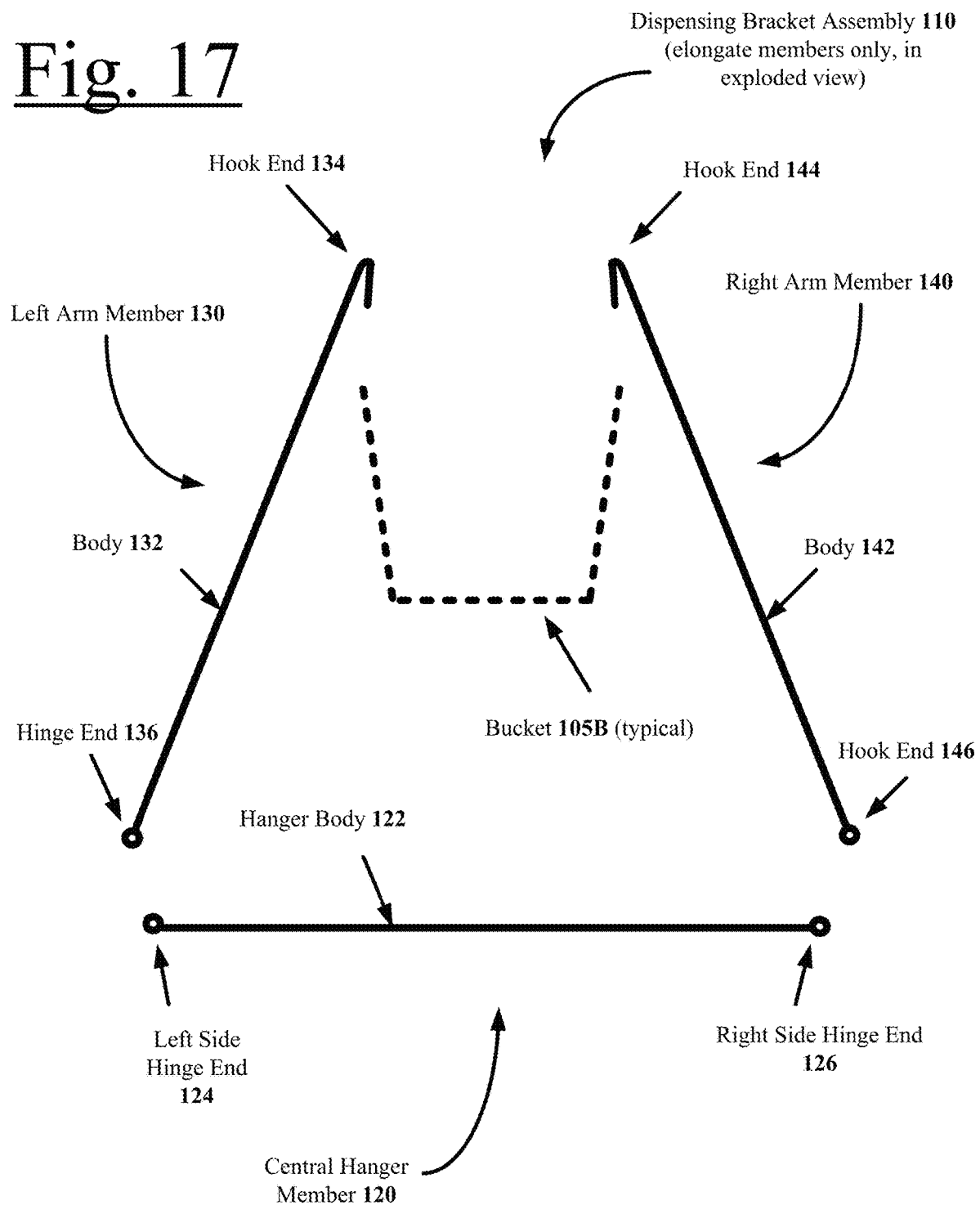
FIG. 17 is a view similar to that of FIG. 16, except that the dispensing bracket assembly 110 is in exploded view and the connecting assemblies are not shown.

Reference is now made FIGS. 16 and 17, which focus upon the elements in the dispensing bracket assembly 110.

The dispensing bracket assembly 110 includes the following components:

Central hanger member 120
Left arm member 130
Right arm member 140
Left side connecting assembly 150
Right side connecting assembly 160

The central hanger member 120 is substantially vertical when in use, and is the member upon which the coiled bundles of disposable flexible material are hung and from which the dispensable flexible material is fed. In one configuration it is made of construction "rebar", which has been heated and hammered such that each end is a somewhat flat tab, with a hole then drilled in each tab. That being said, other transverse cross sections can be used, which are square, round, hollow or solid, or other suitable shapes).

Referring now particularly to FIG. 17, the central hanger member 20 includes the following components:
Hanger body 122
Left side hinge end 124
Right side hinge end 126

Each of these hinge ends 124, 126, is on an opposing respective end of the elongate hanger body 120. As noted above, in one configuration each element is made of "rebar", which has been heated and hammered on one end such that each hinge end 124, 126, is flattened somewhat compared to the substantially circular transverse cross section of the body 122, and each end includes a through hole through which a machine screw will extend, as discussed elsewhere. The axis of each through hole is substantially perpendicular to the longitudinal axis of the body 122, and the two axes are likewise substantially parallel to each other for reasons discussed elsewhere. While the drawing shown in FIGS. 16 and 17 show what appear to be "rings" with holes in them for illustrative purposes, it should be understood that in one working embodiment, each of the hinge ends are created by heating and hammering each end into a somewhat flat tab, with a hole then drilled in each tab.

Continuing in reference to FIG. 17, the left arm member 30 includes the following components:
Hanger body 132
Hook end 134
Hinge end 136

The left arm member 130 is made of "rebar" in one configuration (although others are contemplated), with the hinge end 136 of the left arm member 130 shaped much like the left and right side hinge ends 122, 124, of the central hanger member 120. As will be discussed elsewhere, this is to allow such ends to accept an elongate fastener such as a machine screw in order to allow for a pivoting connection about a preselected pivot axis.

The hook end 134 of the left arm member 130 includes a turned back "hook portion" which allows the left arm member to be hooked over a planar member such as the side of a bucket 105B, as described elsewhere. In one configuration this hook portion is about 4 inches long. This hook end may be thought of as bending around an axis which is parallel to the bore/pivot axis of the hinge end 136, while remaining in a plane which is perpendicular to said bore/pivot axis.

Continuing in reference to FIG. 4, the right arm member 140 includes the following components:
Hanger body 142
Hook end 144
Hinge end 146

The right arm member 140 is made of "rebar" in one configuration. The hinge end 146 of the right arm member 140 is shaped much like the left and right side hinge ends 122, 124, of the central hanger member 120. As will be discussed elsewhere, this is to allow such ends to accept an elongate fastener such as a machine screw in order to allow for a pivoting connection.

The hook end 144 of the right arm member 140 includes a turned back hook portion which allows the right arm member to be hooked over a planar member such as the side of a bucket 105B, as described elsewhere. In one configuration this hook portion is about 4 inches long. This hook end may be generally thought of as bending around an axis which is parallel to the bore/pivot axis of the hinge end 146, while remaining in a plane which is perpendicular to said bore/pivot axis.

Conventional connection hardware is used to connect the elements 130, 140, and 150 together in order to arrive at the assembled configuration shown in FIG. 16. This consists of left side connecting assembly 150 and right side connecting assembly 160. These assemblies 150, 160, are similar in content and construction, so the description of one can be used to describe the other.

Left side connecting assembly 150 connects the left side hinge end 124 of the central hanger member 120 to the hinge end 136 of the left arm member 130. Right side connecting assembly 160 connects the right side hinge end 126 of the central hanger member 120 to the hinge end 136 of the left arm member 130.

Figure 18:
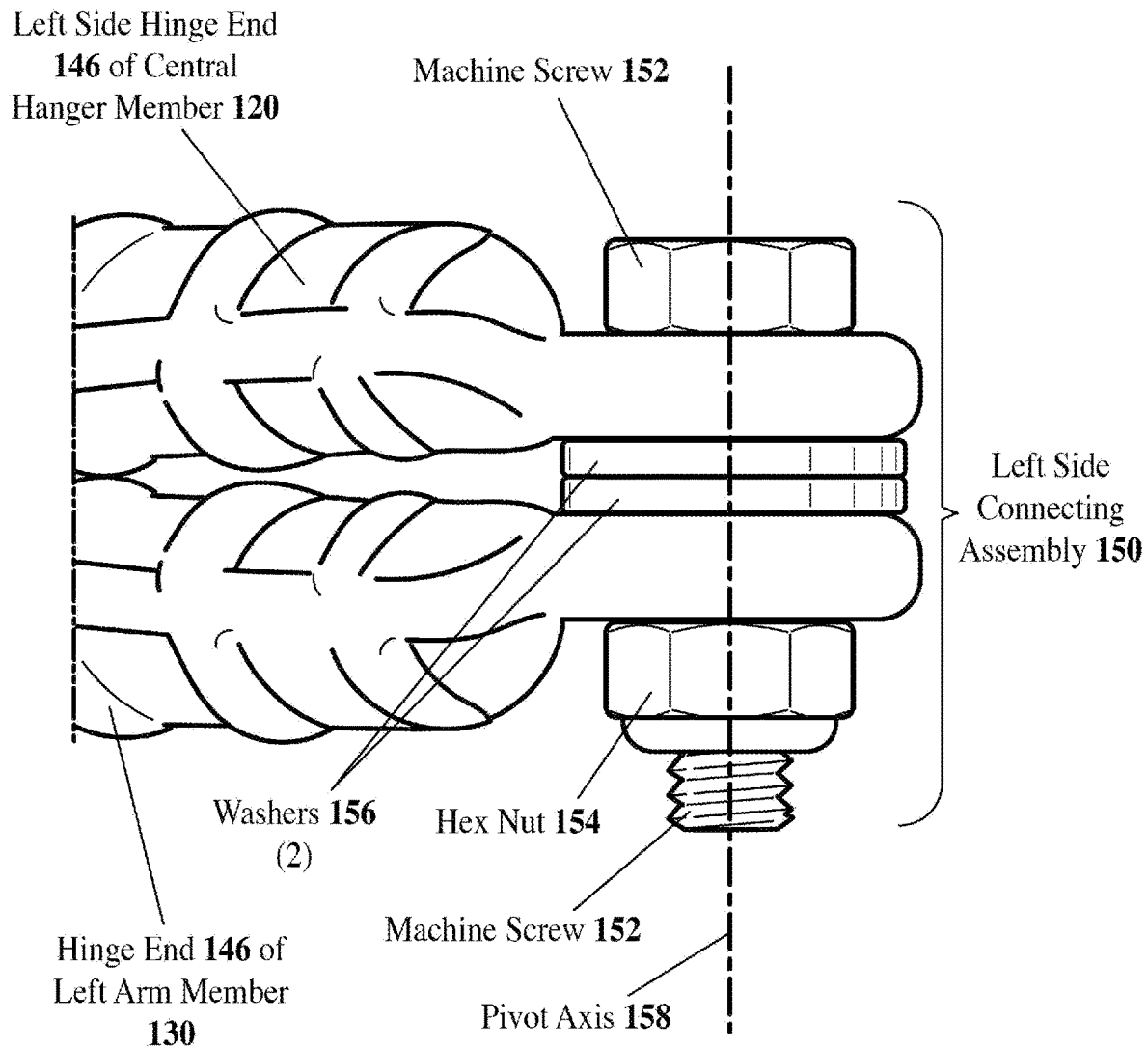
FIG. 18 is a more detailed view of the left side connecting assembly 150, which includes a machine screw 152, hex nut 154, and flat washers 156. The left side connecting assembly 150 provides a pivoting connection between the central hanger member 120 and the left arm member 130, which provides several advantages. This pivoting connection is about a pivoting axis 158, which is substantially common to the longitudinal axis of the machine screw 152.
Figure 19:
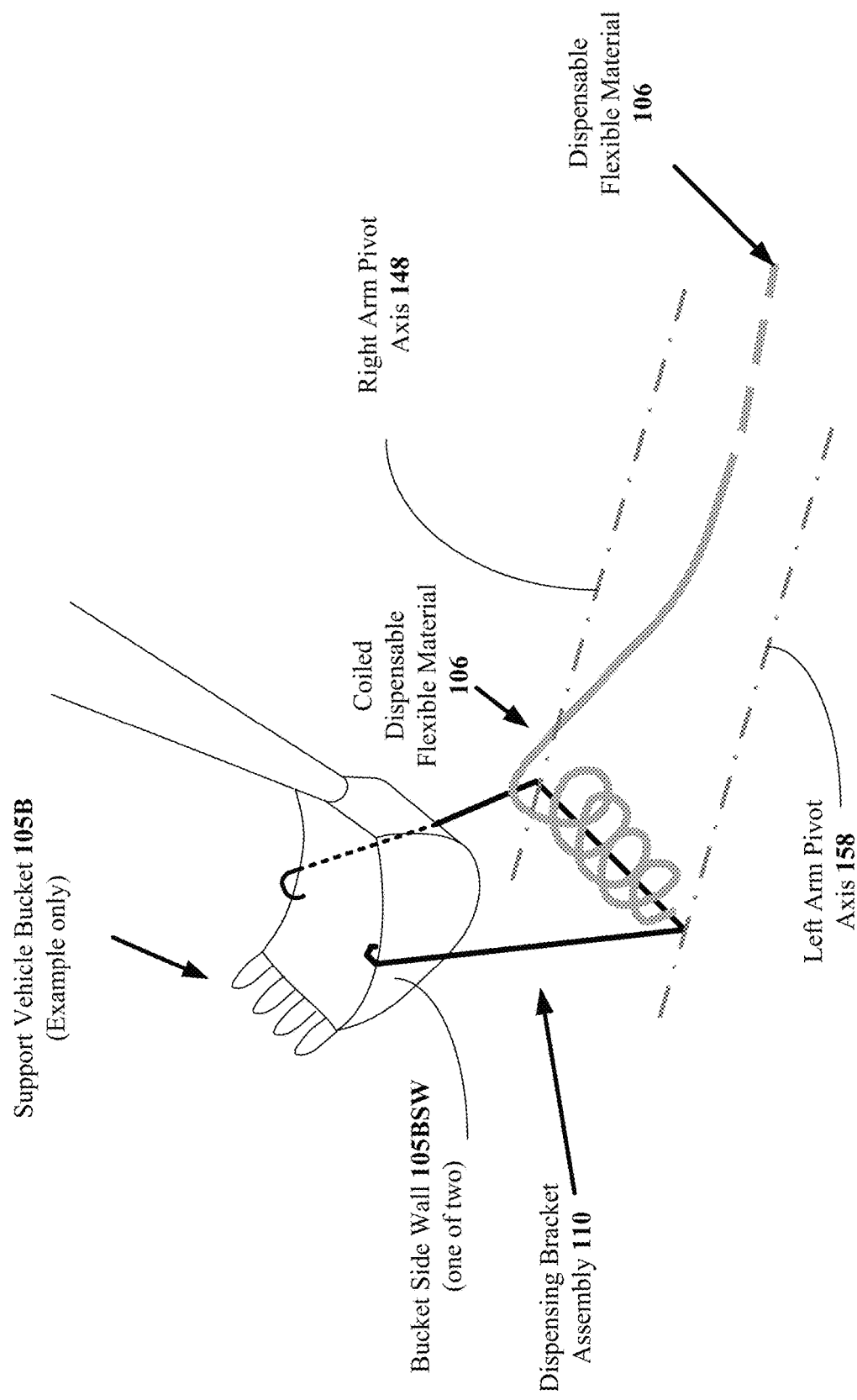
FIG. 19 is an illustrative view of the dispensing bracket assembly 10 includes supported by a typical bucket 105B. The two coparallel pivot axes 148, 158 are shown. It may be understood that these two pivot axes are substantially parallel to the primary planar surfaces of the two side walls 105BSW of the vehicle bucket 105B.

Referring now also to FIG. 18, the left side connecting assembly 150 includes the following components:
Machine screw 152
Hex nut 154
Flat washers 156

As noted above, the left side connecting assembly 150 connects the left side hinge end 124 of the central hanger member 120 to the hinge end 136 of the left arm member 130. This is done as shown in FIG. 18 by the use of a machine screw 152 which passes first through the left side hinge end 124 of the central hanger member 120, then through two flat washers 156, then through the hinge end 146 of the left arm member 130, to be finally captured by the hex nut 154. The nut 154 is tightened such that the left arm member 130 can pivot about the pivot axis 158 relative to the central hanger member 120.

As noted above, the right side connecting assembly 160 connects the right side hinge end 126 of the central hanger member 120 to the hinge end 146 of the right arm member 140. While not shown in the figures, this is done by the use of a machine screw which passes first through the hinge end 146 of the right arm member 140, then through two flat washers 166, then through the right side hinge end 126 of the central hanger member 120, to be finally captured by a hex nut 164. The nut 164 is tightened such that the right arm member 140 can pivot about the pivot axis 168 relative to the central hanger member 120.

Attachment to Supporting Vehicle

To attach the dispensing bracket assembly 110 to the bucket of a supporting vehicle, the bracket assembly 110 is manipulated generally to the position shown in FIG. 16, and then the two downwardly-directed hook ends are hooked over the side walls of a typical bucket 105B. The bracket assembly 110 can then freely hang.

Loading of Bundle of Flexible Material

To describe the loading of the dispensing bracket assembly 110, reference is now made to FIGS. 24A-24B, which are sequential illustrative views of a coiled bundle of dispensable flexible material 106 being loaded onto the dispensing bracket assembly 110. Under one configuration, the right arm member 140 is moved into a configuration such as shown in FIG. 24A such that the coiled bundle of flexible material 106 may be slid onto the right arm member 140. This sliding is continued such as the coiled bundle of flexible material 106 may be slid further until it is in the position shown in FIG. 24B, in which it is loaded onto the central hanging member 120. At this point, the right arm member 140 may be pivoted from the position in FIG. 24A to the position shown in FIG. 24B, upon which the bundle is loaded and ready for dispersal.

It should be understood that the assembly 110 and the method for loading described above has an advantage in that while the coiled material 106 is positioned on the central hanger 120 as shown in FIG. 24B, the left arm member 130 can be supported by the bucket (not shown in this figure). This in turn would support the left side of the hanger member, along with the material 106, thus providing support and a mechanical advantage while the right arm member 140 is situated in place, upon which the bundle is loaded and ready for dispersal.

Dispensing of Flexible Material

Once the dispensing bracket assembly 110 is attached to the bucket of a supporting vehicle, and a coiled bundle of flexible material 106 is threaded onto the central hanger member 120, the flexible material may be dispensed off of the central hanger member 120. This may be done by pulling the flexible material off the dispensing bracket assembly 110 while it is stationary, or alternately the free end of the flexible material could be held in place while the supporting vehicle moves away therefrom while the flexible material is peeled off of its coiled bundle.

The dispensing bracket assembly 110 is configured to support a coiled bundle of dispansable flexible material 106 which may be stored in coiled form but dispensed into an elongate configuration such as in an elongate ditch or the like, in one configuration by use of a human manually grasping the free end of the dispansable material and pulling it into and through the ditch while the person is walking on the earthen ground and while the support vehicle (including the bucket proximate the end of the ditch defined by the earthen ground) is stationary.

Storage and Transport

The three elongate elements 120, 130, and 140 of the dispensing bracket assembly 110 are fastened together in a manner which facilitates folding of the overall dispensing bracket assembly 110 in a highly compact manner. This is provided by a "stacked" manner of arranging the three elongate elements 120, 130, and 140 during initial assembly. It could also be generally referenced as a "Z-shaped" stack.

The manner in which this is done is described in reference to FIGS. 20 and 25. In one manner of assembly, once the elements 120, 130, and 140 are cut, bent, and drilled to their final shapes as described elsewhere, they are prepared to be assembled.

The left arm member 130 may first be laid upon a flat horizontal surface with the hole of its hinge end being substantially along a vertical axis. The central hanger member 120 may then be laid atop the left arm member 130, with the holes of their corresponding hinge ends in alignment along a vertical axis. At this point the connecting hardware comprising the left side connecting assembly 150 may then be added, thus connecting the two members 130, 120.

At this point, the right arm member 140 may be laid atop the central hanger member 120, with the holes of their corresponding hinge ends in alignment. At this point the connecting hardware comprising the right side connecting assembly 160 may then be added, thus connecting the two members 140, 120. At this point the bracket assembly 110 is fully assembled and in its stacked or compacted state, suitable for storage and/or transport.

It may thus be seen by reviewing the interconnecting configuration shown in FIGS. 20 and 25, the central hanger member when so assembled is "sandwiched" between the other two arm members, when the bracket assembly 110 is fully folded into its storage configuration as shown in FIG. 22.

Dispansable Flexible Materials

It may be understood that the coiled bundle of flexible material 106 shown in FIGS. 24A and 24B is not coiled onto a hub, which is typical of flexible material such as for example 4" corrugated drainpipe, which is a flexible material, built with alternating ridges and grooves. Such corrugated drainpipe is typically coiled from discrete lengths of pipe into a coiled, "donut-shaped", bundle that is held together by short lengths of rope or wire. These short lengths of rope or wire are located at several locations around the diameter of the donut shaped bundle, with the sole purpose of preventing the coiled material from unraveling during storage or transport to the job site. Once such a tied bundle is placed on the central hanger member of the present configuration, it is intended that the short lengths of tie wire or rope are removed in order to allow the coiled bundle of flexible material to be unraveled as needed.

Alternatively, the use of a coiled bundle of flexible material which is coiled around a central hub is also contemplated under this invention, such as would be used for electrical wiring or other such material.

The flexible material 106 may include coiled lengths of elongate materials such as wiring (electrical or fencing), flexible tubing, flexible drain or supply piping, or any other materials which can be coiled and/or stored on a spool.

Materials Types and Dimensions

The three elongate elements 120, 130, and 140 shown in FIGS. 20 and 22 may be made in one embodiment out of ½ inch or other size "rebar" such as used in concrete construction, which may be composed of carbon steel, typically consisting of hot-rolled round bars with deformation patterns. However other elongate materials could be used without departing from the spirit and scope of the present invention.

Other materials and thicknesses may also be used to suit the particular environment and/or type of elongate material being dispensed. Such elongate dispansable materials may include electrical wiring (sheathed or unsheathed) various sizes of plastic tubing or conduit, or other suitable flexible materials which may be stored in a coiled state prior to dispensing. Depending on the duty needed, the size of the elements may be varied.

The central hanger member 120 may in one configuration be 36 inches, although other lengths are contemplated without departing from the spirit and scope of the present invention.

The left arm member 130 may in one configuration be 36 inches, although other lengths are contemplated without departing from the spirit and scope of the present invention. The bent-over hook may have a length of 4 inches, although other lengths are contemplated without departing from the spirit and scope of the present invention.

The central hanger member 140 may in one configuration be 36 inches, although other lengths are contemplated without departing from the spirit and scope of the present invention. The bent-over hook may have a length of 4 inches, although other lengths are contemplated without departing from the spirit and scope of the present invention.

Variations

In one configuration the width of the support vehicle bucket 105B is 18 inches, although other widths may be used. The hinged connections allow for use on multiple bucket widths, as well as to allow for compact shipping.

As noted above as shown in FIGS. 24A-B, the coiled bundle of flexible material 106 may be slid onto the right arm member 140 (or left arm member) if it is detached from the bucket. However, it may also be understood that the present invention contemplates the use of a coiled bundle of flexible material which is coiled around a central hub. Such a configuration would be the case for material such as electrical wiring or the like. If the hook members are too large for a hub hole, it may be necessary to detach an arm member from the hanger member to be able to thread the hub on the hanger member. If this is a regular occurrence, the connection points between the members 120, 130, and 140, could be provided with cotter pins, wing nuts, or other readily separable hardware, to allow for easier detachment of an arm member from the hanger member in the field.

Advantages

Advantages of this system are many. The use of the particular hinged connection, in combination with the orientation of the hooked members relative thereto, allows for a configuration that maintains the central hanger portion in a substantially stable configuration relative to the supporting bucket (does not twist, etc., relative to the bucket). The stacked nature of the three main elements as shown in FIGS. 20, 22, and 25 also provides for a very compact configuration for storage or transport.

Further Variations

Further various modifications and variations can be made in the present invention without departing from the spirit or scope of the invention.

For example, the digging process could include the use of a front end loader type bucket such as shown in FIG. 2 or 15, with the bucket on the front end loader being positioned adjacent to a ditch dug by the front end loader, and the bucket being used as support for either of the dispensing assemblies 10 or 110, as a human manually grasping the free end of the dispensable material and pulling it into and through the ditch while the person is walking on the earthen ground and while the support vehicle (including the bucket proximate the end of the ditch defined by the earthen ground) is stationary. Alternately, in either of the uses of the front end loader type bucket such as shown in FIG. 2 or 15, or the backhoe type machine shown in FIG. 1 or 14, either of the dispensing assemblies 10 or 110 could be used, with either the vehicle moving to dispense the roll while the free end of the roll is held manually stationary, or while a human manually grasping the free end of the dispensable material and pulling it into and through the ditch while the person is walking on the earthen ground and while the support vehicle (including the bucket proximate the end of the ditch defined by the earthen ground) is stationary.

The human manually grasping the free end of the dispensable material as shown in see FIG. 5B can also apply to FIGS. 1, 2, and 14 and 15 as it pulls the piping into and through the ditch while a person is walking on the earthen ground and while the support vehicle (including the bucket proximate the end of the ditch defined by the earthen ground) is stationary.

Conclusion

Various modifications and variations can be made in the present invention without departing from the spirit or scope of the invention.

From the foregoing, it will be seen that this invention is one well adapted to obtain all the ends and objects herein set forth, together with other advantages which are obvious, and which are inherent to the structure.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method for dispensing flexible elongate piping into an elongate ditch defined by earthen ground, said method comprising the steps of:
   A) providing a backhoe having a bucket;
   B) providing a flexible coiled pipe configuration comprising a coil of said flexible elongate piping rolled into an overlapping circular configuration, said configuration defining a central hole including an axis therethrough about which said pipe is coiled, and including a free end;
   C) providing an elongate ditch in said earthen ground by use of said backhoe bucket;
   D) providing a dispensing hanger assembly convertible from a retracted position to an extended position, said hanger assembly including:
      1) An elongate central frame member;
      2) A plurality of foldable radial support members each retractably mounted relative to said central frame member, each of said foldable radial support members mounted to move between from a retracted position to an extended position relative to said central frame member as said hanger assembly is converted from said retracted position to an extended position;
      3) An attachment portion configured to be attached to said backhoe bucket; and
      4) a swivel connection configured to connect and provide a swivel connection between said elongate central frame member and said attachment portion, such that said elongate central frame member and said radial support members can swivel relative to said attachment portion when attached to said bucket;
   E) unfolding said dispensing hanger assembly from said retracted position to said extended position;
   F) subsequent to Step "E", loading said coiled pipe configuration onto said dispensing hanger assembly while each of said foldable radial support members is in said extended position such that said coiled pipe configuration is in a loaded configuration, said loading including the insertion of said central frame member into said hole of said coiled pipe configuration such that at least two of said foldable radial support members support the weight of said coiled pipe configuration;
   G) subsequent to Step "F", attaching said attachment portion of said dispensing hanger assembly to said bucket of said backhoe such that said dispensing hanger assembly loaded with said coiled pipe configuration is hanging from said bucket;
   H) positioning said backhoe bucket proximate to said ditch; and
   I) subsequent to Step "H", dispensing said flexible coiled pipe configuration such that said flexible coiled pipe configuration uncoils into an elongate configuration and into said elongate ditch, by the use of a human manually grasping said free end of said coiled pipe configuration and pulling said pipe into and through said elongate ditch while the person is walking on said ground and said backhoe is stationary, such that said coiled pipe configuration is uncoiled as said elongate central frame member and said radial support members of said swivel relative to said attachment portion of said dispensing hanger assembly attached to said bucket.

2. The method as claimed in claim 1, wherein upon the completion of step "F", said elongate central frame member is vertical.

3. The method as claimed in claim 1, wherein upon the completion of step "F", said elongate central frame member is vertical, and such that said elongate central frame member and said radial support members can swivel relative to said attachment portion about a vertical axis when attached to said bucket.

4. The method as claimed in claim 3, wherein step "D" comprises the provision of four foldable radial support members each retractably mounted relative to said central frame member, each of said four foldable radial support members mounted to move between from a retracted position to an extended position relative to said central frame member as said hanger assembly is converted from said retracted position to an extended position.

5. The method as claimed in claim 4, wherein step "D" further comprises the provision of said four foldable radial support members each retractably mounted relative to said central frame member in a mechanically interconnected manner such that all radial support members extend and retract at the same time.

6. The method as claimed in claim 1, wherein step "H" is after Step "G", in that said positioning said backhoe bucket proximate to said ditch is done after said loading of said coiled pipe configuration onto said hanger assembly.

7. The method as claimed in claim 6, wherein upon the completion of step "F", said elongate central frame member is vertical, and such that said elongate central frame member and said radial support members can swivel relative to said attachment portion about a vertical axis when attached to said bucket.

8. The method as claimed in claim 7, wherein step "D" comprises the provision of four foldable radial support members each retractably mounted relative to said central frame member, each of said four foldable radial support members mounted to move between from a retracted position to an extended position relative to said central frame member as said hanger assembly is converted from said retracted position to an extended position.

9. The method as claimed in claim 8, wherein step "D" further comprises the provision of said four foldable radial support members each retractably mounted relative to said central frame member in a mechanically interconnected manner such that all radial support members extend and retract at the same time.

10. The method as claimed in claim 1, wherein step "H" is before Step "G", in that said positioning said backhoe bucket proximate to said ditch is done before said loading of said coiled pipe configuration onto said hanger assembly.

11. The method as claimed in claim 10, wherein upon the completion of step "F", said elongate central frame member is vertical, and such that said elongate central frame member and said radial support members can swivel relative to said attachment portion about a vertical axis when attached to said bucket.

12. The method as claimed in claim 11, wherein step "D" comprises the provision of four foldable radial support members each retractably mounted relative to said central frame member, each of said four foldable radial support members mounted to move between from a retracted position to an extended position relative to said central frame member as said hanger assembly is converted from said retracted position to an extended position.

13. The method as claimed in claim 12, wherein step "D" further comprises the provision of said four foldable radial support members each retractably mounted relative to said central frame member in a mechanically interconnected manner such that all radial support members extend and retract at the same time.

14. The method as claimed in claim 1, wherein in step "F", said attaching said attachment portion of said hanger assembly to said bucket of said backhoe includes the use of a loop member being a part of said attachment portion, said loop member configured to be attached to a tooth of said bucket.

15. A method for dispensing flexible elongate piping into an elongate ditch defined by earthen ground, said method comprising the steps of:
A) providing a support vehicle having a bucket;
B) providing a flexible coiled pipe configuration comprising a coil of said flexible elongate piping rolled into an overlapping circular configuration, said configuration defining a central hole including an axis therethrough about which said pipe is coiled, and including a free end;
C) providing an elongate ditch in said earthen ground;
D) providing a dispensing hanger assembly convertible from a retracted position to an extended position, said hanger assembly including:
1) An elongate central frame member;
2) A plurality of foldable radial support members each retractably mounted relative to said central frame member, each of said foldable radial support members mounted to move between from a retracted position to an extended position relative to said central frame member as said hanger assembly is converted from said retracted position to an extended position;
3) An attachment portion configured to be attached to said bucket; and
4) a swivel connection configured to connect and provide a swivel connection between said elongate central frame member and said attachment portion, such that said elongate central frame member and said radial support members can swivel relative to said attachment portion when attached to said bucket;
E) unfolding said dispensing hanger assembly from said retracted position to said extended position;
F) subsequent to Step "E", loading said coiled pipe configuration onto said dispensing hanger assembly while each of said foldable radial support members is in said extended position such that said coiled pipe configuration is in a loaded configuration, said loading including the insertion of said central frame member into said hole of said coiled pipe configuration such that at least two of said foldable radial support members support the weight of said coiled pipe configuration;
G) subsequent to Step "F", attaching said attachment portion of said dispensing hanger assembly to said bucket of said support vehicle such that said dispensing hanger assembly loaded with said coiled pipe configuration is hanging from said bucket;
H) positioning said support vehicle bucket proximate to said ditch; and
I) subsequent to Step "H", dispensing said flexible coiled pipe configuration such that said flexible coiled pipe configuration uncoils into an elongate configuration and into said elongate ditch.

* * * * *